(12) United States Patent
Kimchi et al.

(10) Patent No.: US 9,975,644 B1
(45) Date of Patent: May 22, 2018

(54) AERIAL VEHICLE PROPULSION MODULES

(71) Applicant: Amazon Technologies, Inc., Seattle, WA (US)

(72) Inventors: Gur Kimchi, Bellevue, WA (US); Dominic Timothy Shiosaki, Seattle, WA (US); Ricky Dean Welsh, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 14/976,845

(22) Filed: Dec. 21, 2015

(51) Int. Cl.
| | | |
|---|---|---|
| *G01C 23/00* | (2006.01) | |
| *B64D 35/04* | (2006.01) | |
| *B64D 35/02* | (2006.01) | |
| *B64C 39/02* | (2006.01) | |
| *B64D 27/24* | (2006.01) | |

(52) U.S. Cl.
CPC .......... *B64D 35/04* (2013.01); *B64C 39/024* (2013.01); *B64D 27/24* (2013.01); *B64D 35/02* (2013.01); *B64C 2201/024* (2013.01); *B64C 2201/042* (2013.01); *B64C 2201/108* (2013.01); *B64C 2201/141* (2013.01)

(58) Field of Classification Search
CPC ........ B64D 35/04; B64D 27/24; B64D 35/02; B64C 39/024; B64C 2201/024; B64C 2201/042; B64C 2201/108; B64C 2201/141
USPC ................... 701/2, 3, 8; 244/54, 62
See application file for complete search history.

(56) References Cited

U.S. PATENT DOCUMENTS

| | | | | |
|---|---|---|---|---|
| 2010/0003886 A1* | 1/2010 | Cheng | .................... | A63H 27/12 446/37 |
| 2012/0083945 A1* | 4/2012 | Oakley | .................. | B64C 27/08 701/2 |
| 2012/0241555 A1* | 9/2012 | Savoye | .................. | A63H 27/12 244/54 |
| 2014/0061376 A1* | 3/2014 | Fisher | .................... | B64D 27/24 244/62 |
| 2014/0263823 A1* | 9/2014 | Wang | .................... | B64C 39/028 244/17.23 |
| 2016/0179096 A1* | 6/2016 | Bradlow | ................. | B64C 19/00 701/8 |
| 2016/0225264 A1* | 8/2016 | Taveira | ................. | B64C 39/024 |
| 2016/0253907 A1* | 9/2016 | Taveira | ................. | G08G 5/006 701/3 |

(Continued)

*Primary Examiner* — Shardul D Patel
(74) *Attorney, Agent, or Firm* — Athorus, PLLC

(57) ABSTRACT

An aerial vehicle may be equipped with propulsion modules that include motors, sensors, transceivers, controllers, power sources or other components therein. The propulsion modules may be releasably mounted to the aerial vehicle in a manner that allows a propulsion module to be removed and replaced when one or more of the components within the propulsion module requires maintenance or repairs, thereby enabling the aerial vehicle to return to service promptly. The propulsion modules may communicate via wired or wireless means with one another, or with a central computer system onboard the aerial vehicle. The propulsion modules may be interchangeably installed on each of the aerial vehicles in a class, or on aerial vehicles in different classes. Furthermore, aerial vehicles may be equipped with varying numbers of propulsion modules, as needed, subject to one or more operational requirements or constraints.

20 Claims, 24 Drawing Sheets

(56) References Cited

U.S. PATENT DOCUMENTS

2017/0066531 A1\* 3/2017 McAdoo .............. H02K 7/1815

\* cited by examiner

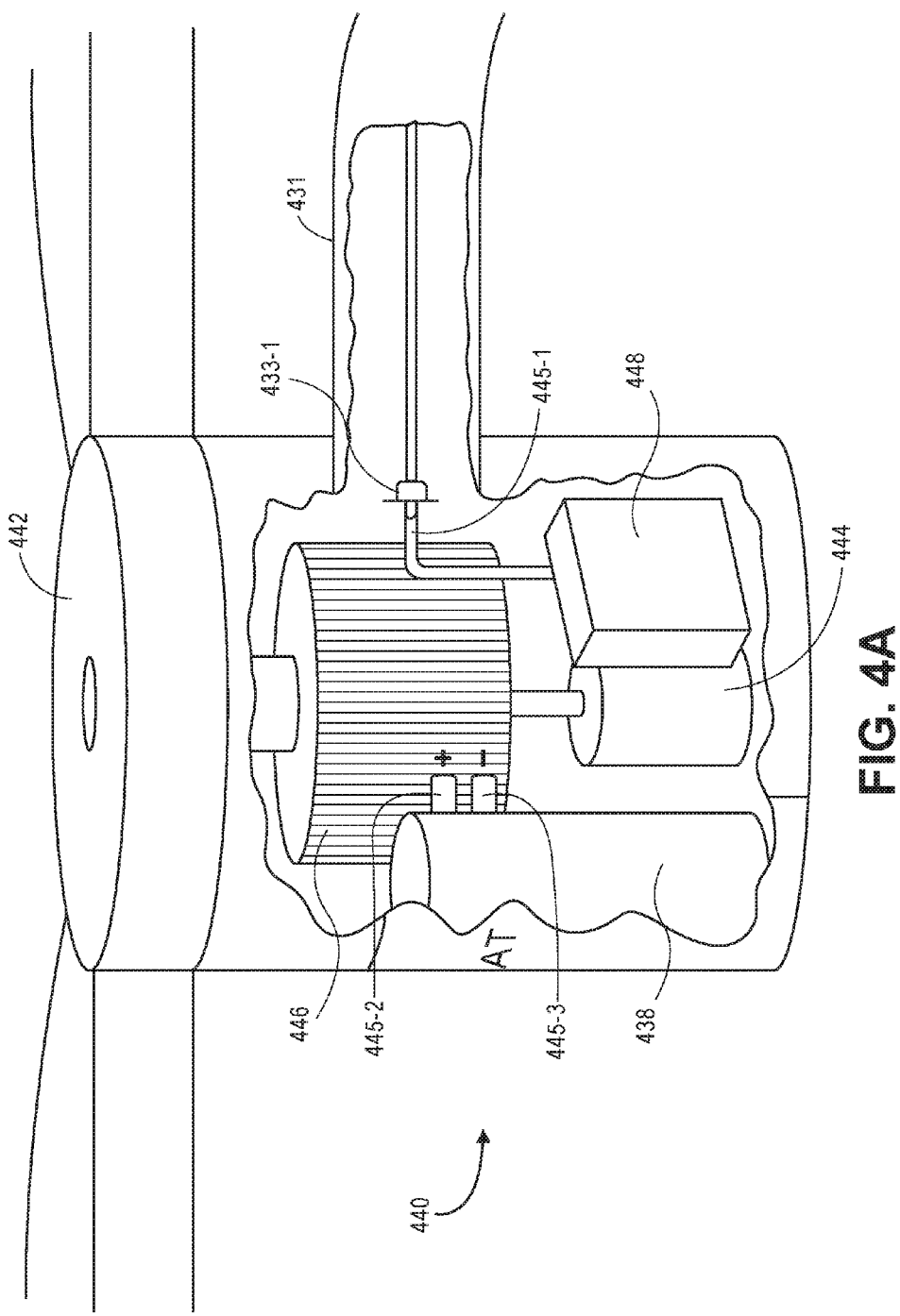

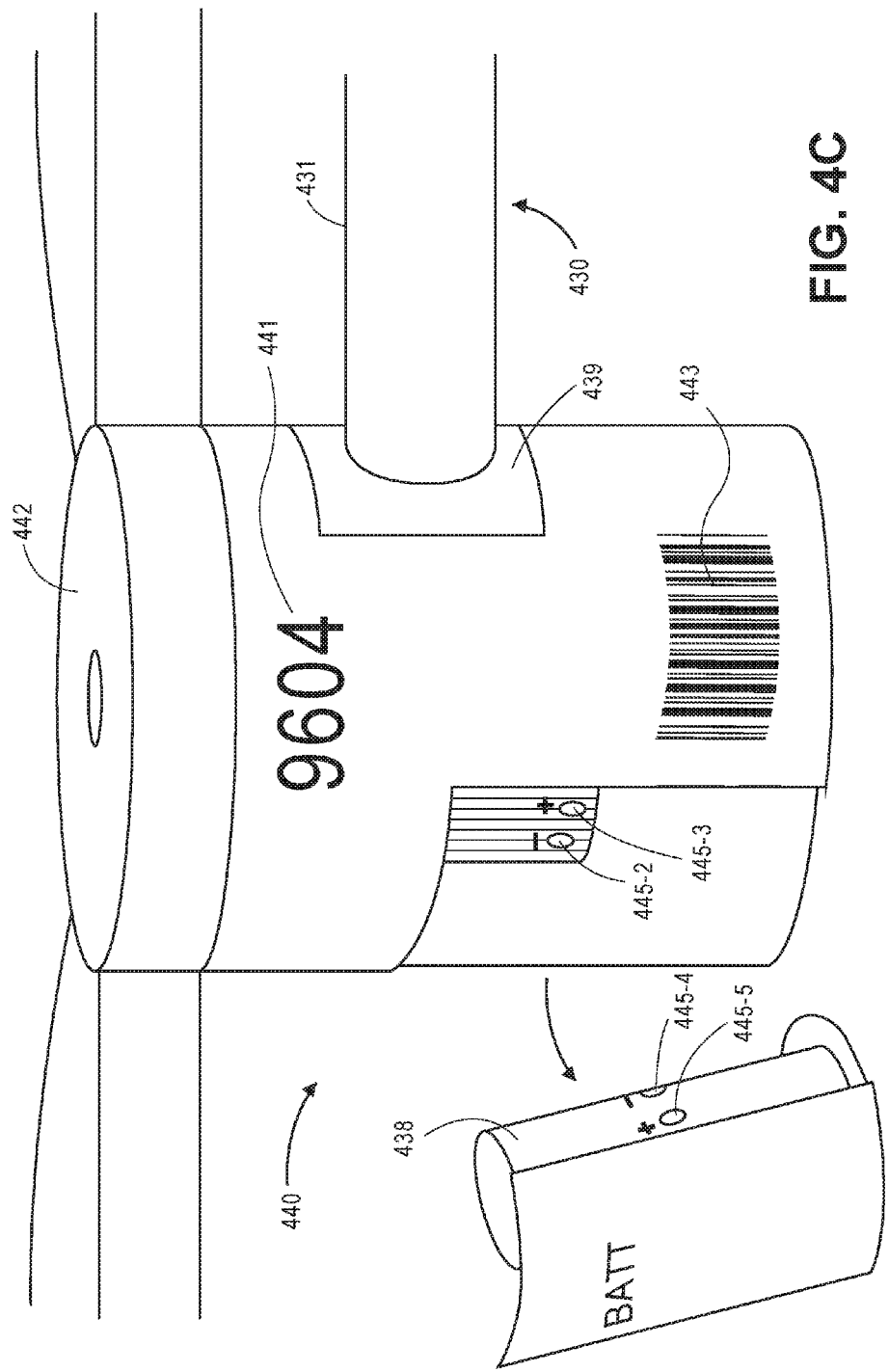

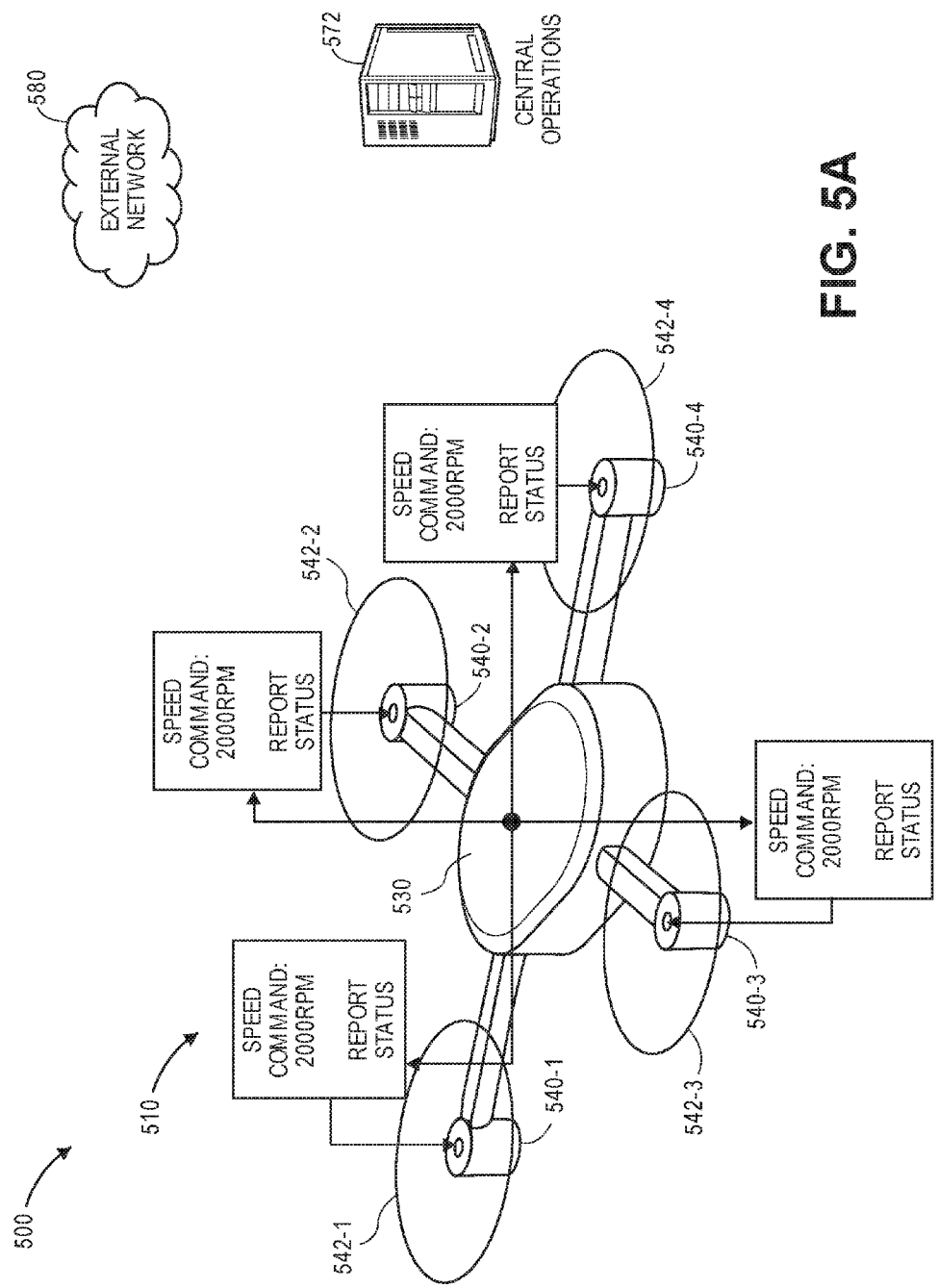

AERIAL VEHICLE PROPULSION MODULES

BACKGROUND

Today, unmanned aerial vehicles (or "UAVs") are used increasingly frequently in an ever-growing number of applications, including but not limited to surveillance, law enforcement, military, safety, crop management, inspection or delivery operations. A modern unmanned aerial vehicle is typically an integrated system including a number of propellers, motors, communication equipment, imaging devices, power sources and various other components or machines, and may, in some embodiments, be configured to retrieve, transport or deposit payloads of various sizes. Characterized by their comparatively small sizes and high maneuverability, unmanned aerial vehicles may often perform tasks at lower costs, and with lower levels of risk to humans, than other powered vehicles, including but not limited to manned aerial vehicles.

Like any other transportation vehicle, an unmanned aerial vehicle is ineffective when it cannot operate as intended. Because unmanned aerial vehicles lack human pilots, an unmanned aerial vehicle may not suffer from traditional human fatigue symptoms, but the various components of an unmanned aerial vehicle do require routine maintenance and attention in order to ensure that the unmanned aerial vehicle remains in good working order, and may continue to perform missions on command.

As new applications for which unmanned aerial vehicles may be utilized are identified, unmanned aerial vehicles have become more and more complex. Unmanned aerial vehicles now include motors disposed on arms mounted to frames, and a variety of other standard or mission-specific, technologically advanced components of small sizes and weights, each of which may require physical connections to one or more central computers and power sources. As a result, when one of these components requires maintenance, is in a degraded condition or fails outright, the entire unmanned aerial vehicle must be taken out of service until an issue plaguing one or more of the respective components is identified and diagnosed, and the components are repaired or replaced.

BRIEF DESCRIPTION OF THE DRAWINGS

FIGS. 4A through 4C are views of aspects of propulsion modules in accordance with embodiments of the present disclosure.

FIGS. 5A through 5C are views of aspects of one system including an aerial vehicle having propulsion modules in accordance with embodiments of the present disclosure.

DETAILED DESCRIPTION

Figure 1A:
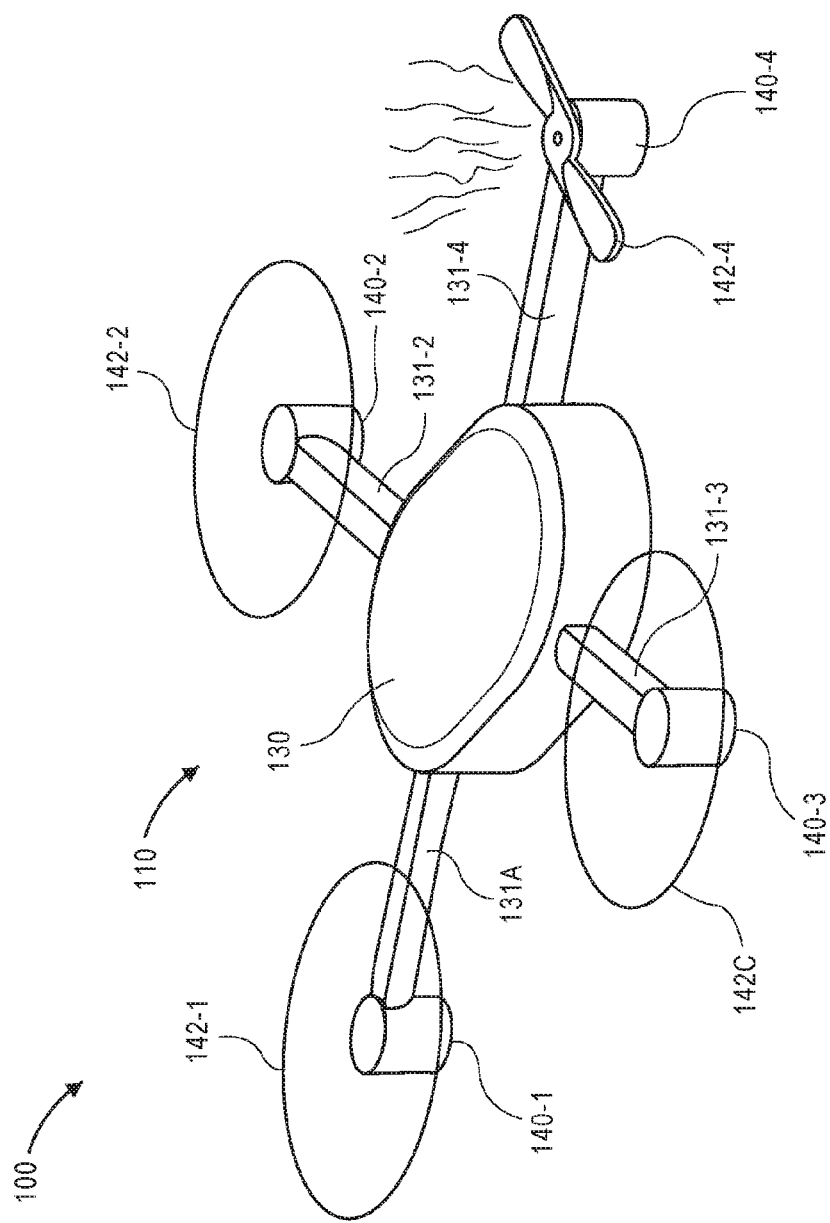
FIGS. 1A through 1G are views of aspects of one system including an aerial vehicle having propulsion modules in accordance with embodiments of the present disclosure.

As is set forth in greater detail below, the present disclosure is directed to propulsion modules that may be releasably installed onto one or more aerial vehicles, e.g., unmanned aerial vehicles. More specifically, the systems and methods disclosed herein are directed to aerial vehicles having detachable modules including a propeller, a prime mover (e.g., a motor) for rotating the propeller, one or more control units for operating the prime mover, and one or more communication devices or components. The propulsion modules of the present disclosure may be mounted to frames of aerial vehicles in a quick-release fashion, and may be configured to mate with corresponding portions of such frames, and to form wired or wireless connections with one or more central power sources and/or communications systems.

The propulsion modules of the present disclosure may be connected to a frame of an aerial vehicle in any releasable or detachable manner. The propulsion modules and/or the frames or other components of the aerial vehicle may be formed from any suitably durable material, e.g., carbon fiber, aluminum, titanium or a composite material. In some embodiments, each of the propulsion modules may be powered from a centralized power source provided on an aerial vehicle. In some other embodiments, each of the propulsion modules provided on the aerial vehicle may include a corresponding power source. Likewise, in some embodiments, each of the propulsion modules provided on an aerial vehicle may communicate with a centralized operations module, or with one another, via a wired connection, such as by one or more electrical conductors or an optical cable, according to any relevant protocol, including but not limited to a Controller Area Network (CAN) protocol. In some other embodiments, each of the propulsion modules may communicate with the centralized operations module wirelessly (e.g., according to one or more wireless communications protocols such as Wireless Fidelity, or "WiFi," Bluetooth®, radio frequency identification devices, or "RFID"). Moreover, in some embodiments, the same propulsion module, or propulsion modules of a common class, may be interchangeably installed on different types, models, styles or classes of aerial vehicle.

Therefore, in a manner similar to a pit stop for a race car, when one or more propulsion modules of the present disclosure requires maintenance, repair or replacement, or is otherwise not operating properly, the propulsion modules may be quickly and easily removed from an aerial vehicle frame. Equally quickly and easily, one or more replacement propulsion modules may be installed on the aerial vehicle, thereby enabling the aerial vehicle to promptly to service in a relatively brief period of time.

Referring to FIGS. 1A through 1G, views of aspects of one system 100 including an aerial vehicle having propulsion modules in accordance with embodiments of the present disclosure are shown. The system 100 includes an aerial vehicle 110 having a frame 130 and a plurality of propulsion modules 140-1, 140-2, 140-3, 140-4, with each of the modules 140-1, 140-2, 140-3, 140-4 configured to rotate a propeller 142-1, 142-2, 142-3, 142-4 under power. Each of the modules 140-1, 140-2, 140-3, 140-4 is mounted to the frame 130 by arms 131-1, 131-2, 131-3, 131-4.

Figure 1B:
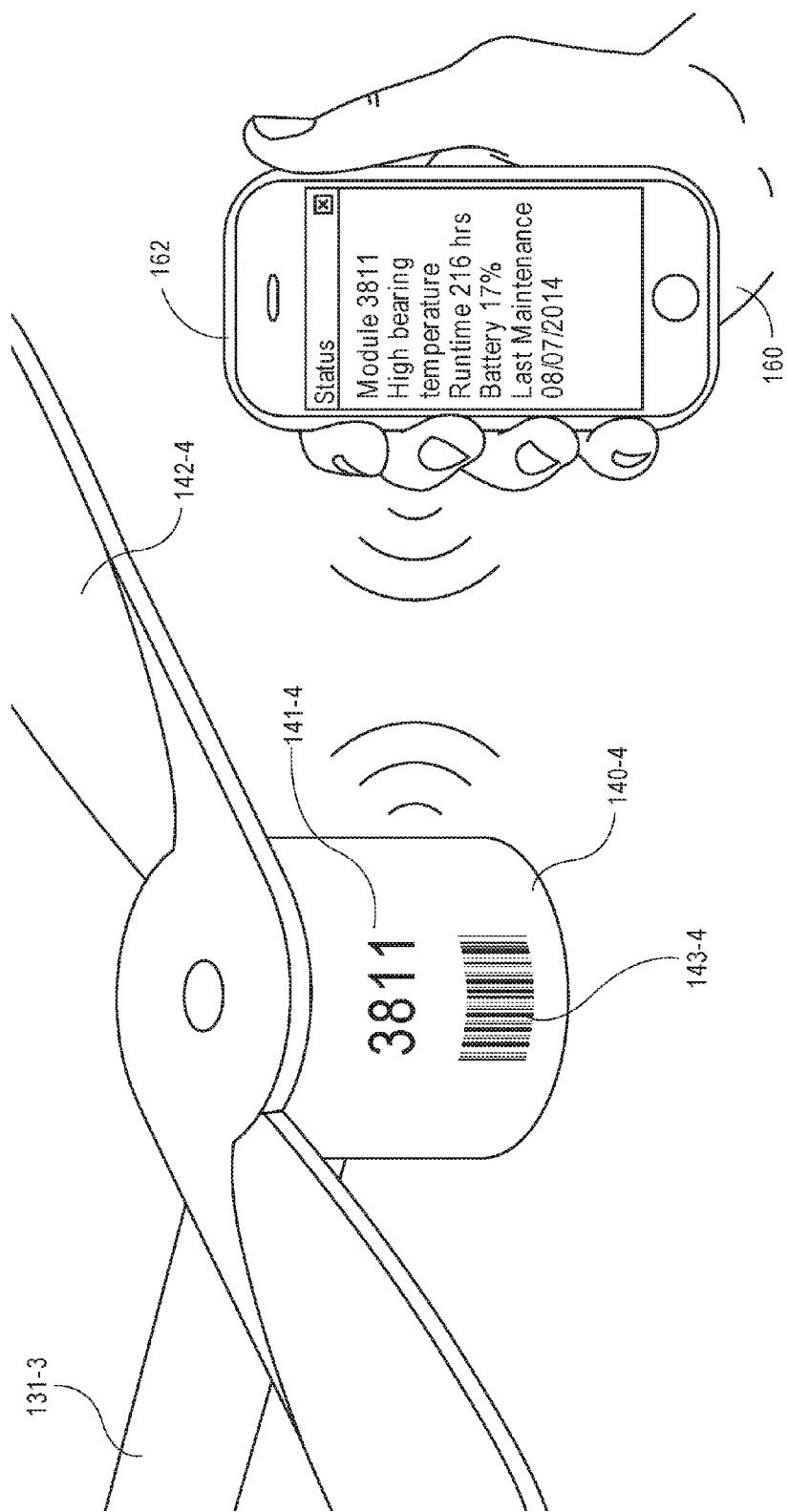

As is shown in FIG. 1A, the modules 140-1, 140-2, 140-3 are operating properly, and the module 140-4 is not operating properly. Accordingly, a worker 160 may approach the module 140-4 and diagnose one or more faults in the module 140-4, e.g., using a handheld device 162 or other computer-based system, or by manual or visual inspection. As is shown in FIG. 1B, the worker 160 may identify the module 140-4, e.g., based on an alphanumeric identifier 141-4 or by scanning a bar code 143-4 (e.g., a one-dimensional or two-dimensional bar code). The worker 160 may also receive and view a status report from the module 140-4, e.g., via a wireless connection with the module 140-4, on the handheld device 162. The status report indicates that the module 140-4 is experiencing high bearing temperatures, and has seventeen percent (17%) of its battery life remaining, with two hundred sixteen hours (216 hrs) of run time since its last maintenance evolution on Aug. 7, 2014. Alternatively, the aerial vehicle 110 or the module 140-4 may be identified and evaluated by an autonomous mobile robot having one or more sensors (not shown).

Figure 1C:
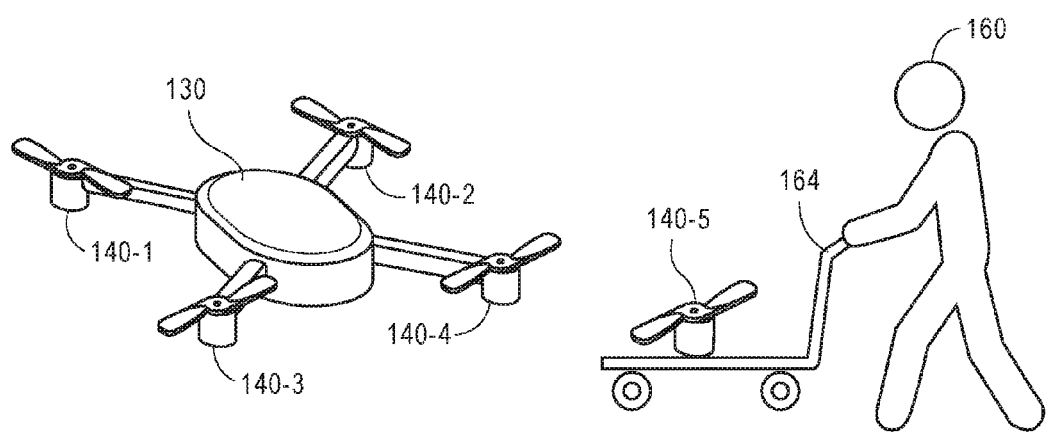
Figure 1D:
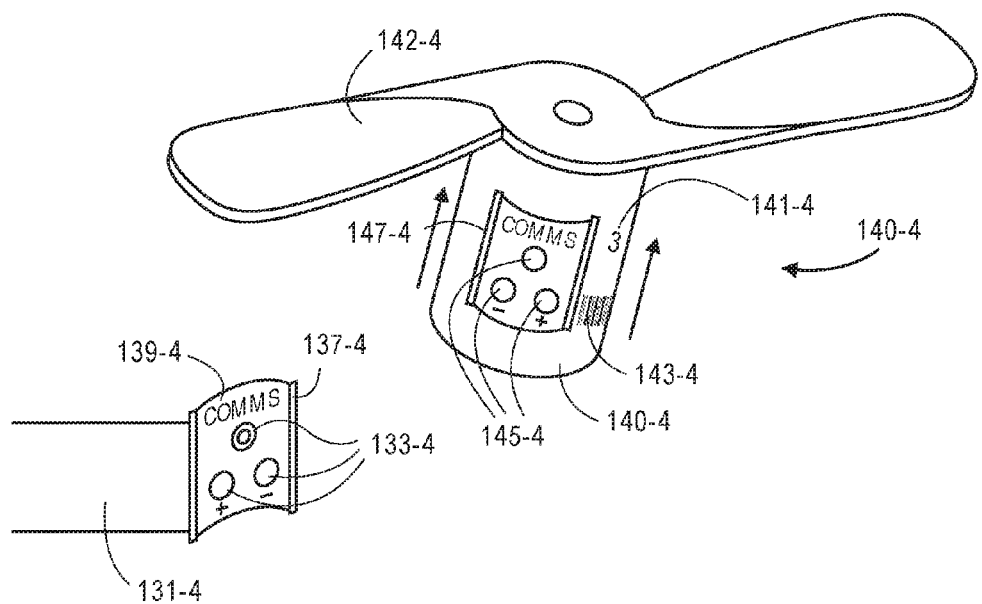

As is shown in FIG. 1C, upon determining that the module 140-4 requires replacement, the worker 160 brings a replacement module 140-5 to the aerial vehicle 110, e.g., on a push cart 164. As is shown in FIG. 1D, the worker 160 may remove the module 140-4 from a mounting plate (or connection plate) 139-4 provided on a distal end of the arm 131-4, such as by sliding the module 140-4 upward along corresponding tracks 137-4, 147-4 provided on the mounting plate 139-4 and the module 140-4. When the module 140-4 is properly installed on the arm 131-4, the module 140-4 and the arm 131-4 may form a smooth, aerodynamically suitable connection between an outer surface of the mounting plate 139-4 and an outer surface of the module 140-4. For example, outer surfaces of the module 140-4 and the mounting plate 139-4 or the arm 131-4 may be joined at flat, rounded, tapered, beveled or faceted junctions, in an aerodynamically suitable manner.

Removing the module 140-4 from the mounting plate 139-4 breaks the connection, and opens and separates power and communication contacts 145-4 provided on the module 140-4 from corresponding power and communication contacts 133-4 provided on the mounting plate 139-4.

Figure 1E:
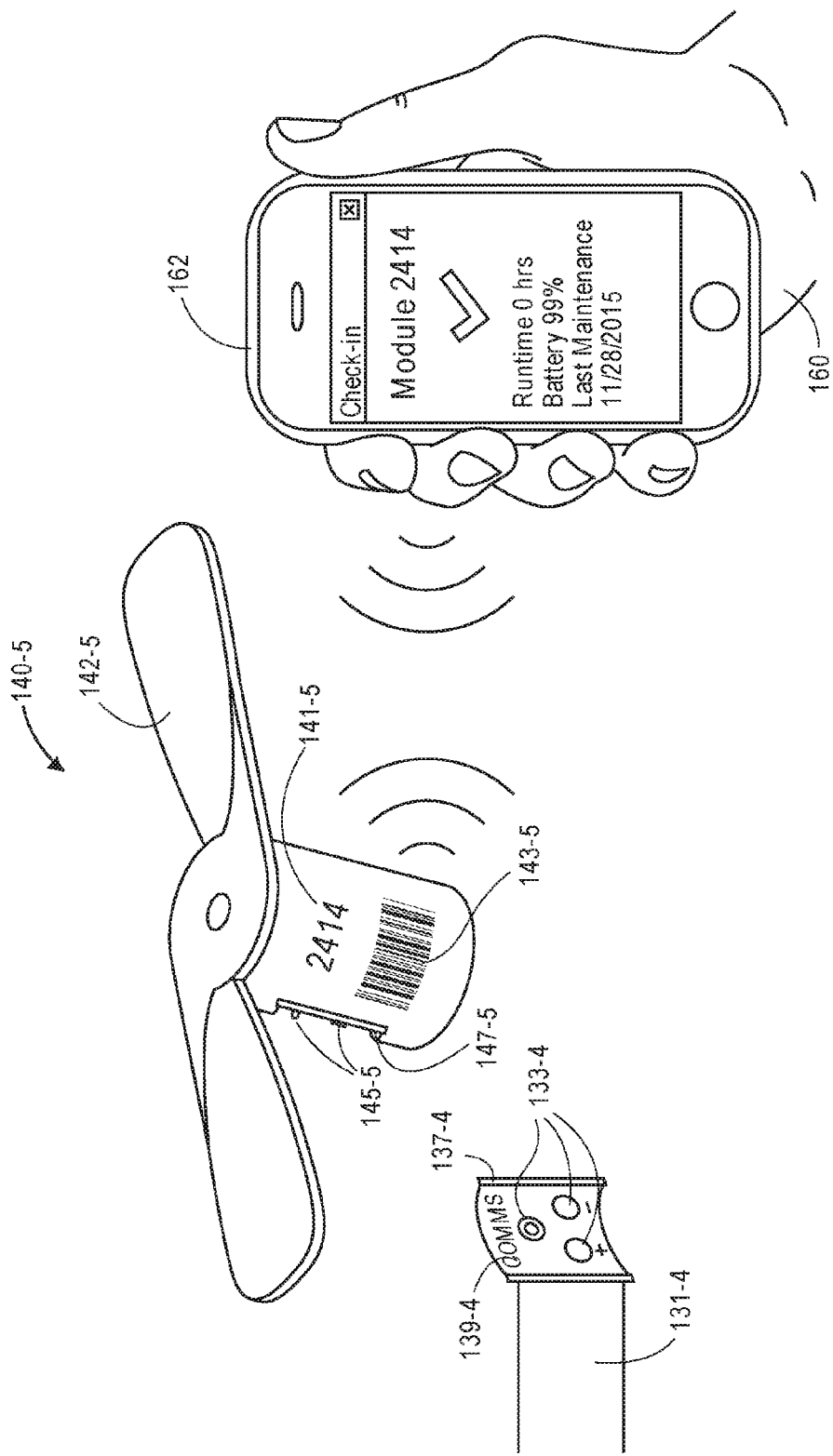

As is shown in FIG. 1E, the worker 160 may also identify the replacement module 140-5, e.g., based on an alphanumeric identifier 141-5 or by scanning a bar code 143-5, and receive and view a status report from the module 140-5 on the handheld device 162. The status report indicates that the module 140-5 has no pending issues, and ninety-nine percent (99%) of its battery life remaining, and has not been run since its last maintenance evolution on Nov. 28, 2015.

Figure 1F:
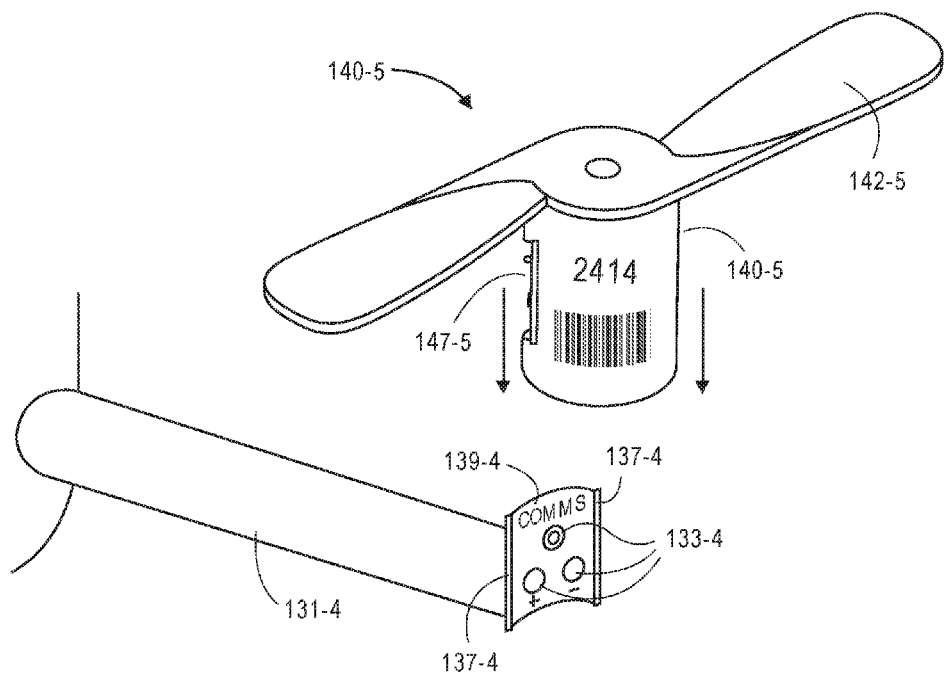
Figure 1G:
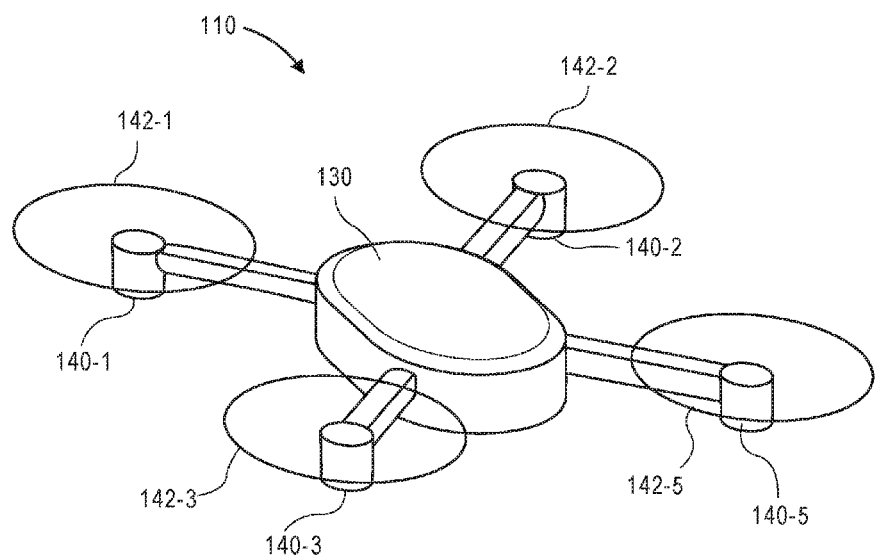

As is shown in FIG. 1F, upon confirming that the module 140-5 is in satisfactory condition and is ready for use by the aerial vehicle 110, the worker 160 may install the module 140-5 on the mounting plate 139-4, e.g., by sliding the module 140-5 downward along the corresponding tracks 137-4, 147-5 provided on the mounting plate 139-4 and the module 140-5, and causing the power and communication contacts 145-5 provided on the module 140-5 to come into contact with corresponding power and communication contacts 133-4 provided on the mounting plate 139-4. As is shown in FIG. 1G, once the module 140-5 is installed on the arm 131-4, the aerial vehicle 110 may command each of the modules 140-1, 140-2, 140-3, 140-5 to initiate an operation of the propellers 140-1, 140-2, 140-3, 140-5, and the aerial vehicle 110 may return to service accordingly.

In accordance with the present disclosure, propulsion modules having one or motors, propellers, sensors, communications components and/or power sources may be provided in, or in association with, a common housing that may be releasably installed on a frame of an aerial vehicle. The modules may include one or more systems for monitoring or tracking their respective operational characteristics and reporting such characteristics to operations systems provide on board the aerial vehicle, or in one or more external locations. The modules may be configured to communicate with such systems via wired or wireless connections, e.g., over Ethernet, fiber optic or other cables, or according to any wireless protocol, and may receive power from a central power source provided on the aerial vehicle, or from one or more power sources provided therein. Where the modules include their own power sources, e.g., batteries provided with motors, sensors, communications equipment or within a common housing (such as within a cavity defined by the common housing), substantial weight savings may be achieved by reducing the lengths and masses of conductive cables required in order to power the motors. Where the modules may communicate wirelessly, further savings in weight or complexity may be achieved.

The modules of the present disclosure may be connected to the frames of the aerial vehicles in any manner that permits the modules to be quickly and easily removed from the frames of the aerial vehicles, or installed thereon, including one or more sliding connections, cantilevered hooks, threaded connections or by any other connectors. The modules may further include one or more sub-modules including one or more components (e.g., a battery) that may be removed from the modules or inserted therein, to further reduce the amount of labor or time required to perform maintenance or repairs on such components, or to replace such components.

The modules of the present disclosure are truly modular, and may be installed or replaced manually or automatically using one or more machines. For example, a module may be identified, diagnosed, and repaired or replaced by one or more human operators or, alternatively, by one or more robots or other machines that may be programmed accordingly. Furthermore, an aerial vehicle may be equipped with propulsion modules having common ratings or capacities in power, lift, thrust, battery life or any other relevant factor. Alternatively, the aerial vehicle may be equipped with propulsion modules having different ratings or capacities, or may have interchangeable ratings or capacities, in accordance with the present disclosure. Moreover, a module may be installed on two or more different aerial vehicles, in response to changes in operational demands, so long as each of the aerial vehicles is comparably equipped to have the module installed thereon and to operate the module accordingly. Additionally, aerial vehicles may be configured to operate with a full complement of modules, or with fewer than a full complement of modules, to meet operational demands.

Figure 2A:
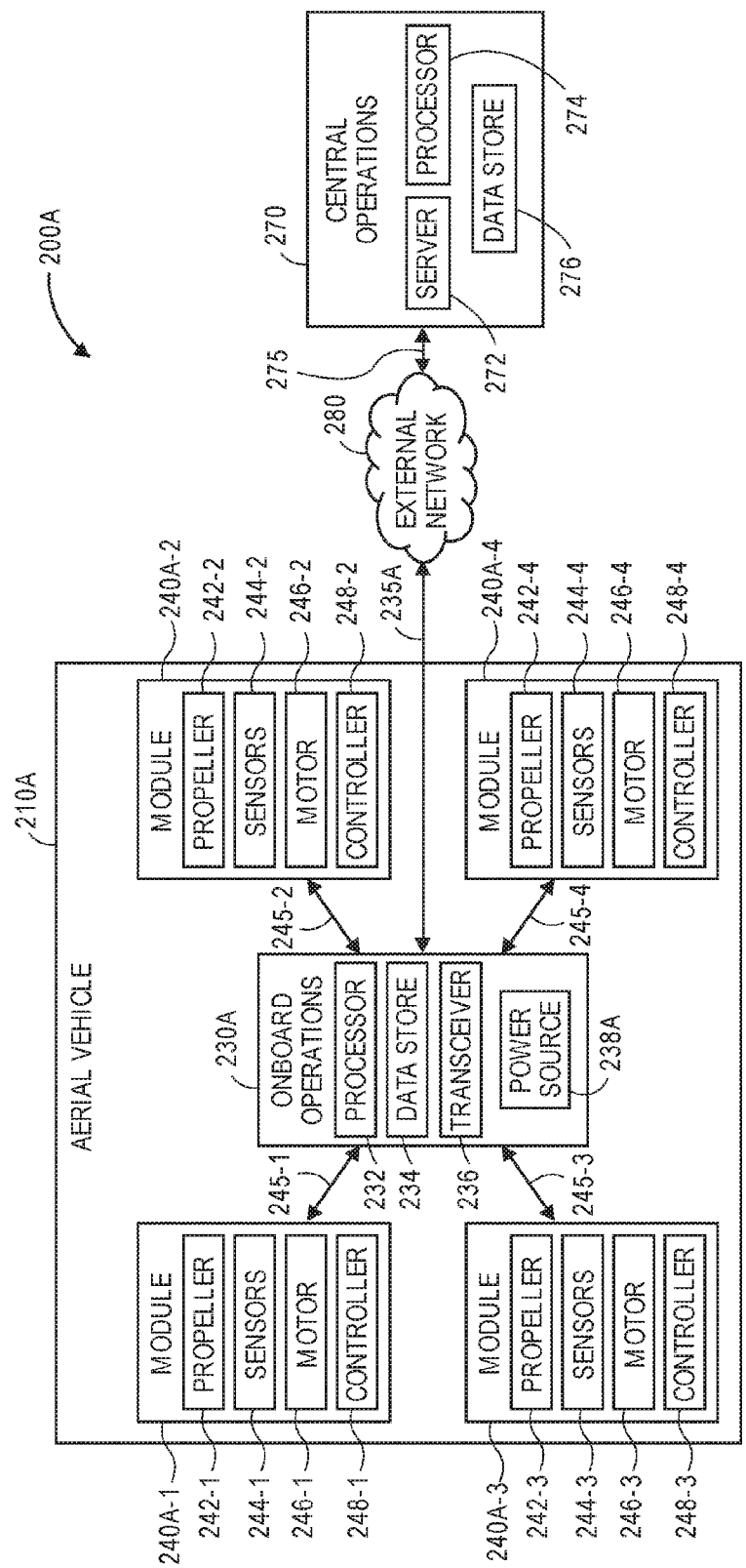
FIGS. 2A and 2B are block diagrams of systems including aerial vehicles having propulsion modules in accordance with embodiments of the present disclosure.

As is discussed above, in some embodiments of the present disclosure, aerial vehicles may include detachable propulsion modules having motors, propellers and controllers in communication with a central operations system. Referring to FIG. 2A, a block diagram of components of one system 200A including an aerial vehicle having propulsion modules in accordance with embodiments of the present disclosure is shown. The system 200A of FIG. 2A includes an aerial vehicle 210A and a central operations system 270 that are connected to one another over an external network 280. Except where otherwise noted, reference numerals preceded by the number "2" shown in the block diagram of FIG. 2A indicate components or features that are similar to components or features having reference numerals preceded by the number "1" shown in FIGS. 1A through 1G.

As is shown in FIG. 2A, the aerial vehicle 210A includes an onboard operations system 230A and a plurality of propulsion modules 240A-1, 240A-2, 240A-3, 240A-4. The onboard operations system 230A includes a processor 232, a data store 234, a transceiver 236 and a power source 238. Each of the modules 240A-1, 240A-2, 240A-3, 240A-4 includes a propeller 242-1, 242-1, 242-3, 242-4, one or more sensors 244-1, 244-2, 244-3, 244-4, a motor 246-1, 246-2, 246-3, 246-4 and a controller 248-1, 248-2, 248-3, 248-4. The onboard operations system 230A may communicate with the each of the modules 240A-1, 240A-2, 240A-3, 240A-4 directly, e.g., via one or more wired or wireless connections, as indicated by lines 245-1, 245-2, 245-3, 245-4, through the sending or receiving digital or analog data. The onboard operations system 230A may further communicate with the central operations system 270 or one or more other computer devices (not shown) over the external network 280, as indicated by line 235A, through the sending and receiving of digital or analog data. The modules 240A-1, 240A-2, 240A-3, 240A-4 may further include one or more other communications devices (not shown), including but not limited to a transceiver or any other communications component.

The onboard operations system 230A may be configured to control all aspects of the operation of the aerial vehicle 210A, either autonomously or with input from one or more external computer systems, e.g., the central operations system 270. For example, the onboard operations system 230A may transmit operating instructions to one or more of the modules 240A-1, 240A-2, 240A-3, 240A-4, e.g., to the controllers 248-1, 248-2, 248-3, 248-4 for controlling the operations of the propellers 242-1, 242-1, 242-3, 242-4, the motors 246-1, 246-2, 246-3, 246-4 and/or the sensors 244-1, 244-2, 244-3, 244-4, or receive information regarding the operations of the aerial vehicle 210A and the respective modules 240A-1, 240A-2, 240A-3, 240A-4. The onboard operations system 230A may further perform one or more functions relating to navigation, surveillance, communication or payload engagement, delivery or retrieval, via one or more associated systems (not shown), e.g., via one or more positioning systems (e.g., GPS systems) or one or more actuators, motors or controllers (not shown) or manipulating one or more items thereon.

The processor 232 may be one or more (e.g., two, four, eight or any other number) processors that are configured to perform any type or form of computing function or executing any instructions by or on behalf of the onboard operations system 230A, including but not limited to the execution of one or more machine learning algorithms or techniques. The processor(s) 232 may be any suitable processor capable of executing instructions. For example, the processor 232 may control any aspects of the operation of the aerial vehicle 210A and the one or more computer-based components thereon, including but not limited to the transceiver 236 and/or the modules 240A-1, 240A-2, 240A-3, 240A-4. The onboard operations system 230A may likewise include one or more control systems (not shown) that may generate instructions for conducting operations thereof, e.g., for instructing the modules 240A-1, 240A-2, 240A-3, 240A-4 to operate at certain speeds or angular velocities, or to control one or more rudders, ailerons, flaps or other control components provided thereon (not shown). Such control systems may be associated with one or more other computing devices or machines, such as the processor 232, and may communicate with the central operations system 270 and/or one or more other computer devices (not shown) over the external network 280, as indicated by line 235A, through the sending and receiving of digital data.

The aerial vehicle 210A further includes one or more data stores 234 or other memory or storage components 234 for storing any type of information or data, e.g., instructions for operating the aerial vehicle 210A, information or data captured by one or more of the sensors 244-1, 244-2, 244-3, 244-4, or information or data regarding propellers of various sizes, shapes or configurations and the noises emitted thereby during operation. For example, the data store 234 may be configured to store executable instructions, flight paths, flight control parameters and/or data items accessible by the processor 232.

The transceiver 236 may be configured to enable the aerial vehicle 210A to communicate through one or more wired or wireless means, e.g., wired technologies such as Universal Serial Bus (or "USB") or fiber optic cable, or standard wireless protocols such as Bluetooth® or any near field communication ("NFC") or Wireless Fidelity (or "WiFi") protocol, such as over the external network 280 or directly. For example, the transceiver 236 may be configured to allow data to be exchanged between the onboard operations system 230A and the central operations system 270 or one or more other computer devices via the external network 280, including but not limited to onboard operations systems of one or more other aerial vehicles (not shown). The transceiver 236 may be further configured to allow data to be exchanged between the onboard operations system 230A and the one or more modules 240A-1, 240A-2, 240A-3, 240A-4.

The power source 238A may be any source of power, fuel or energy for operating the onboard operations system 230A and/or one or more of the motors 246-1, 246-2, 246-3, 246-4. For example, where the motors 246-1, 246-2, 246-3, 246-4 operate using electricity (e.g., alternating current, or "AC," or direct current, or "DC"), the power source 238A may be a battery (e.g., a 6000 mAh lithium-ion polymer battery, or polymer lithium ion battery), an alternator, an inverter, a generator or any other machine or tool for providing electrical power to each of the motors 246-1, 246-2, 246-3, 246-4. Where the motors 246-1, 246-2, 246-3, 246-4 operate using petroleum-based fuels (e.g., gasoline, diesel fuel, propane, natural gas), the power source 238A may be a fuel tank. Alternatively, the power source 238A may include one or more fuel cells, solar cells, or components for generating power from chemical or nuclear reactions. In some embodiments, the aerial vehicle 210A may include two or more different types of power sources 238A, including, for example, a battery for powering electrical loads (e.g., the processor 232, the data stores 234, the transceiver 236 or one or more of the sensors 244-1, 244-2, 244-3, 244-4 or controllers 248-1, 248-2, 248-3, 248-4), and a fuel tank for powering the motors 246-1, 246-2, 246-3, 246-4. In some embodiments, one of the power sources 238A may be designated as a main or primary source, and another of the power sources 238A may be designated as an auxiliary or secondary power source. In some embodiments, one or more of the motors 246-1, 246-2, 246-3, 246-4 may be aligned to provide lift to the aerial vehicle 210A, thrust to the aerial vehicle 210A, or both lift and thrust to the aerial vehicle 210A.

The modules 240A-1, 240A-2, 240A-3, 240A-4 may be any integral propulsion units configured for releasable installation to, into or within the aerial vehicle 210A. For example, in some embodiments, the modules 240A-1, 240A-2, 240A-3, 240A-4 may include internal chambers or regions for housing or supporting one or more of the propellers 242-1, 242-1, 242-3, 242-4, the sensors 244-1, 244-2, 244-3, 244-4, the motors 246-1, 246-2, 246-3, 246-4 or the controllers 248-1, 248-2, 248-3, 248-4. The modules 240A-1, 240A-2, 240A-3, 240A-4 may include one or more components for mounting to the aerial vehicle 210A in any manner or fashion that enables the modules 240A-1, 240A-2, 240A-3, 240A-4 to be securely mounted to the aerial vehicle 210A, or removed from the aerial vehicle 210A, in relatively brief periods of time.

The propellers 242-1, 242-1, 242-3, 242-4 may be one or more bladed mechanical devices for generating one or more propulsive forces, e.g., lift and/or thrust, for the aerial vehicle 210A. The propellers 242-1, 242-1, 242-3, 242-4 may have any mass or dimensions, or any number of blades that are joined to one another, e.g., at a hub, and may, in some embodiments, be balanced statically and/or dynamically. The propellers 242-1, 242-1, 242-3, 242-4 may be rotatably coupled to the motors 246-1, 246-2, 246-3, 246-4, e.g., by a shaft or mast.

The sensors 244-1, 244-2, 244-3, 244-4 may include any type or form of sensor for capturing information or data regarding any aspect of the operation of the aerial vehicle 210A in general, or the motors 246-1, 246-2, 246-3, 246-4 and/or the propellers 242-1, 242-1, 242-3, 242-4 in particular. For example, the sensors 244-1, 244-2, 244-3, 244-4 may include one or more components or features for determining one or more attributes of an environment in which the aerial vehicle 210A is operating, or may be expected to operate, as well as one or more attributes of the aerial vehicle 210A itself including extrinsic information or data or intrinsic information or data. Some such sensors 244-1, 244-2, 244-3, 244-4 may include, but are not limited to, a Global Positioning System ("GPS") receiver or sensor, a compass, a speedometer, an altimeter, a tachometer, a thermometer, a barometer, a hygrometer, or a gyroscope. Those of ordinary skill in the pertinent arts will recognize that the sensors 244-1, 244-2, 244-3, 244-4 may further include any type or form of device or component for determining an environmental condition within a vicinity of the aerial vehicle 210A in accordance with the present disclosure. For example, the sensors 244-1, 244-2, 244-3, 244-4 may also include one or more air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), attitude indicators, depth gauges, accelerometers or the like, as well as one or more imaging devices (e.g., digital cameras, depth sensors or infrared sensors).

The sensors 244-1, 244-2, 244-3, 244-4 may also include other components or features for detecting and capturing sound energy in a vicinity of an environment in which the aerial vehicle 210A is operating, or may be expected to operate. Such sensors 244-1, 244-2, 244-3, 244-4 may include one or more microphones (e.g., a transducer such as a dynamic microphone, a condenser microphone, a ribbon microphone or a crystal microphone configured to convert acoustic energy of any intensity and across any or all frequencies into one or more electrical signals, and may include any number of diaphragms, magnets, coils, plates, or other like features for detecting and recording such energy), piezoelectric sensors (e.g., sensors configured to convert changes in pressure to electrical signals, including one or more crystals, electrodes or other features), or vibration sensors.

The motors 246-1, 246-2, 246-3, 246-4 may be any type or form of motor or other prime mover for causing the propellers 242-1, 242-1, 242-3, 242-4 to rotate at a selected speed or angular velocity. For example, one or more of the motors 246-1, 246-2, 246-3, 246-4 may be a brushless DC motor such as an outrunner brushless motor or an inrunner brushless motor. Alternatively, one or more of the motors 246-1, 246-2, 246-3, 246-4 may be a shunt motor, a separately excited motor, a permanent magnet motor, a reluctance motor, a hysteresis motor, an induction motor or a synchronous motor. The motors 246-1, 246-2, 246-3, 246-4 may receive instructions for operation via one or more computer devices, e.g., the controllers 248-1, 248-2, 248-3, 248-4, that may generate instructions for initiating or stopping operations of the motors 246-1, 246-2, 246-3, 246-4, or operating the motors 246-1, 246-2, 246-3, 246-4 at any selected speed.

The controllers 248-1, 248-2, 248-3, 248-4 may be any software applications and/or or hardware computer devices for controlling the operations of one or more components within the respective modules 240A-1, 240A-2, 240A-3, 240A-4. The controllers 248-1, 248-2, 248-3, 248-4 may include, for example, one or more computer processors that are coupled to one or more memory devices or data stores. For example, the controllers 248-1, 248-2, 248-3, 248-4 may be configured to receive instructions from the onboard operations system 230A for operating the motors 246-1, 246-2, 246-3, 246-4 at specific speeds or angular velocities, or in one or more predetermined modes. The controllers 248-1, 248-2, 248-3, 248-4 may be further configured to receive inputs from one or more of the sensors 244-1, 244-2, 244-3, 244-4 regarding the operation of the aerial vehicle 210A, e.g., dynamic attributes such as altitudes, courses, speeds, rates of climb or descent, turn rates, or accelerations, operating speeds of the motors 246-1, 246-2, 246-3, 246-4, tracked positions (e.g., latitudes and/or longitudes), or the environment in which the aerial vehicle 210A is operating, e.g., environmental conditions (e.g., temperatures, pressures, humidities, wind speeds and directions), times of day or days of a week, month or year when an aerial vehicle is operating, measures of cloud coverage, sunshine, or surface conditions or textures (e.g., whether surfaces are wet, dry, covered with sand or snow or have any other texture) within a given environment.

The central operations system 270 includes one or more physical computer servers 272 having a plurality of databases 274 associated therewith, as well as one or more computer processors 276 provided for any specific or general purpose. For example, the central operations system 270 of FIG. 2 may be independently provided for the exclusive purpose of receiving, analyzing or storing acoustic signals or other information or data received from the aerial vehicle 210A, or from one or more other aerial vehicles (not shown) over the external network 280, as indicated by line 235A, through the sending and receiving of digital or analog data. In some embodiments, the central operations system 270 may provide executable instructions, flight paths, flight control parameters and/or data items to the onboard operations system 230A, or to one or more of the modules 240A-1, 240A-2, 240A-3, 240A-4. In some embodiments, the central operations system 270 may receive information or data regarding the operation of the aerial vehicle 210A, or one or more other aerial vehicles (not shown).

The servers 272 may be connected to or otherwise communicate with the databases 274 and the processors 276. The databases 274 may store any type of information or data, including but not limited to instructions, data, flight paths, flight control parameters and/or data items. The servers 272 and/or the computer processors 276 may also connect to or otherwise communicate with the external network 280, as indicated by line 278, through the sending and receiving of digital or analog data. For example, the central operations system 270 may include any facilities, stations or locations having the ability or capacity to receive and store information or data, such as media files, in one or more data stores, e.g., media files received from the aerial vehicle 210A, or from one another, or from one or more other external computer systems (not shown) via the external network 280. In some embodiments, the central operations system 270 may be provided in a physical location. In other such embodiments, the central operations system 270 may be provided in one or more alternate or virtual locations, e.g., in a "cloud"-based environment. In still other embodiments, the central operations system 270 may be provided onboard one or more aerial vehicles, including but not limited to the aerial vehicle 210A.

The external network 280 may be any wired network, wireless network, or combination thereof, and may comprise the Internet in whole or in part. In addition, the external network 280 may be a personal area network, local area network, wide area network, cable network, satellite network, cellular telephone network, or combination thereof. The external network 280 may also be a publicly accessible network of linked networks, possibly operated by various distinct parties, such as the Internet. In some embodiments, the external network 280 may be a private or semi-private network, such as a corporate or university intranet. The external network 280 may include one or more wireless networks, such as a Global System for Mobile Communications (GSM) network, a Code Division Multiple Access (CDMA) network, a Long Term Evolution (LTE) network, or some other type of wireless network.

Figure 2B:
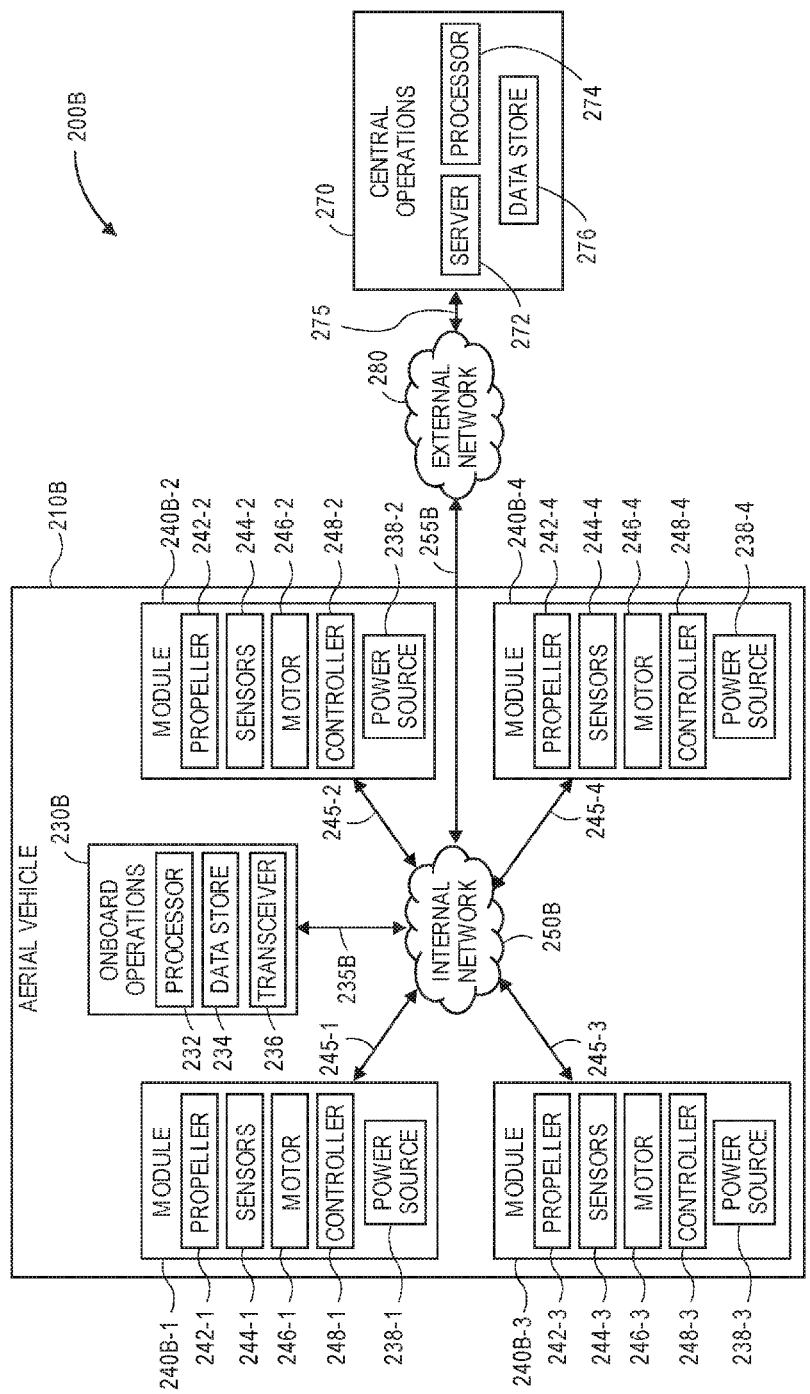

In some embodiments of the present disclosure, the propulsion modules may further include respective power sources, e.g., individual batteries or other electrical power sources, or individual fuel tanks, for each of the modules. Referring to FIG. 2B, a block diagram of components of one system 200B including an aerial vehicle having propulsion modules in accordance with embodiments of the present disclosure is shown. The system 200B of FIG. 2B includes an aerial vehicle 210B and a central operations system 270 that are connected to one another over the external network 280. Except where otherwise noted, reference numerals preceded by the number "2" shown in the block diagram of FIG. 2B indicate components or features that are similar to components or features having reference numerals preceded by the number "2" shown in FIG. 2A.

As is shown in FIG. 2B, the aerial vehicle 210B includes a number of components that are similar or identical to corresponding components of the aerial vehicle 210A of FIG. 2A. The aerial vehicle 210B includes an onboard operations system 230B and a plurality of propulsion modules 240B-1, 240B-2, 240B-3, 240B-4 that are connected to one another over an internal network 250B. Like the onboard operations system 230A of FIG. 2A, the onboard operations system 230B includes the processor 232, the data store 234 and the transceiver 236. Unlike the onboard operations system 230A, however, the onboard operations system 230B does not include a power source for powering the modules 240B-1, 240B-2, 240B-3, 240B-4. Instead, as is shown in FIG. 2B, each of the propulsion modules 240B-1, 240B-2, 240B-3, 240B-4 includes a power source 238B-1, 238B-2, 238B-3, 238B-4 for operating the propellers 242-1, 242-1, 242-3, 242-4, the sensors 244-1, 244-2, 244-3, 244-4, the motors 246-1, 246-2, 246-3, 246-4, and the controllers 248-1, 248-2, 248-3, 248-4. Accordingly, where the motors 246-1, 246-2, 246-3, 246-4 are electrically powered, providing the power sources 238-1, 238-2, 238-3, 238-4 within the respective modules 240B-1, 240B-2, 240B-3, 240B-4 enables the lengths of conductors for powering the motors 246-1, 246-2, 246-3, 246-4 may be dramatically shortened, thereby reducing not only the overall weight of the aerial vehicle 210A but also power losses along such conductors and onboard heat generation due to Joule heating effects (sometimes called "$I^2R$ losses"), and enhancing the reliability of the motors 246-1, 246-2, 246-3, 246-4.

The internal network 250B may be any wired network, wireless network, or combination thereof, for communicating between and among the onboard operations center 230B and the modules 240B-1, 240B-2, 240B-3, 240B-4, as indicated by lines 235B, 245-1, 245-2, 245-3, 245-4. In some embodiments, the internal network 250B may be a wireless network, such as a Global System for Mobile Communications (GSM) network, a Code Division Multiple Access (CDMA) network, a Long Term Evolution (LTE) network, or some other type of wireless network. In some other embodiments, the internal network 250B may be any type of inter-device network including but not limited to a Bluetooth® piconet, a near field communications network, or like networks. In still other embodiments, the onboard operations center 230B and the modules 240B-1, 240B-2, 240B-3, 240B-4 may communicate via a wired connection, e.g., by an electrical conductor, a fiber optic cable, or any other connection. Additionally, as is shown in FIG. 2B, the internal network 250B may connect with the external network 280, as is indicated by line 255B, through the sending or receiving digital or analog data. The modules 240B-1, 240B-2, 240B-3, 240B-4 may further include one or more other communications devices (not shown), including but not limited to a transceiver or any other communications component.

The computers, servers, devices and the like described herein have the necessary electronics, software, memory, storage, databases, firmware, logic/state machines, microprocessors, communication links, displays or other visual or audio user interfaces, printing devices, and any other input/ output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicles 210A, 210B or the central operations system 270 may use any web-enabled or Internet applications or features, or any other client-server applications or features including E-mail or other messaging techniques, to connect to the external network 280, or to communicate with one another, such as through short or multimedia messaging service (SMS or MMS) text messages. For example, the aerial vehicles 210A, 210B may be adapted to transmit information or data in the form of synchronous or asynchronous messages to the central operations system 270 or to any other computer device in real time or in near-real time, or in one or more offline processes, via the internal network 250B or the external network 280. Those of ordinary skill in the pertinent art would recognize that the aerial vehicles 210A, 210B or the central operations system 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 232, the processors 242-1, 242-1, 242-3, 242-4 or the processor 274, or any other computers or control systems utilized by the aerial vehicles 210A, 210B or the central operations system 270, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3A:
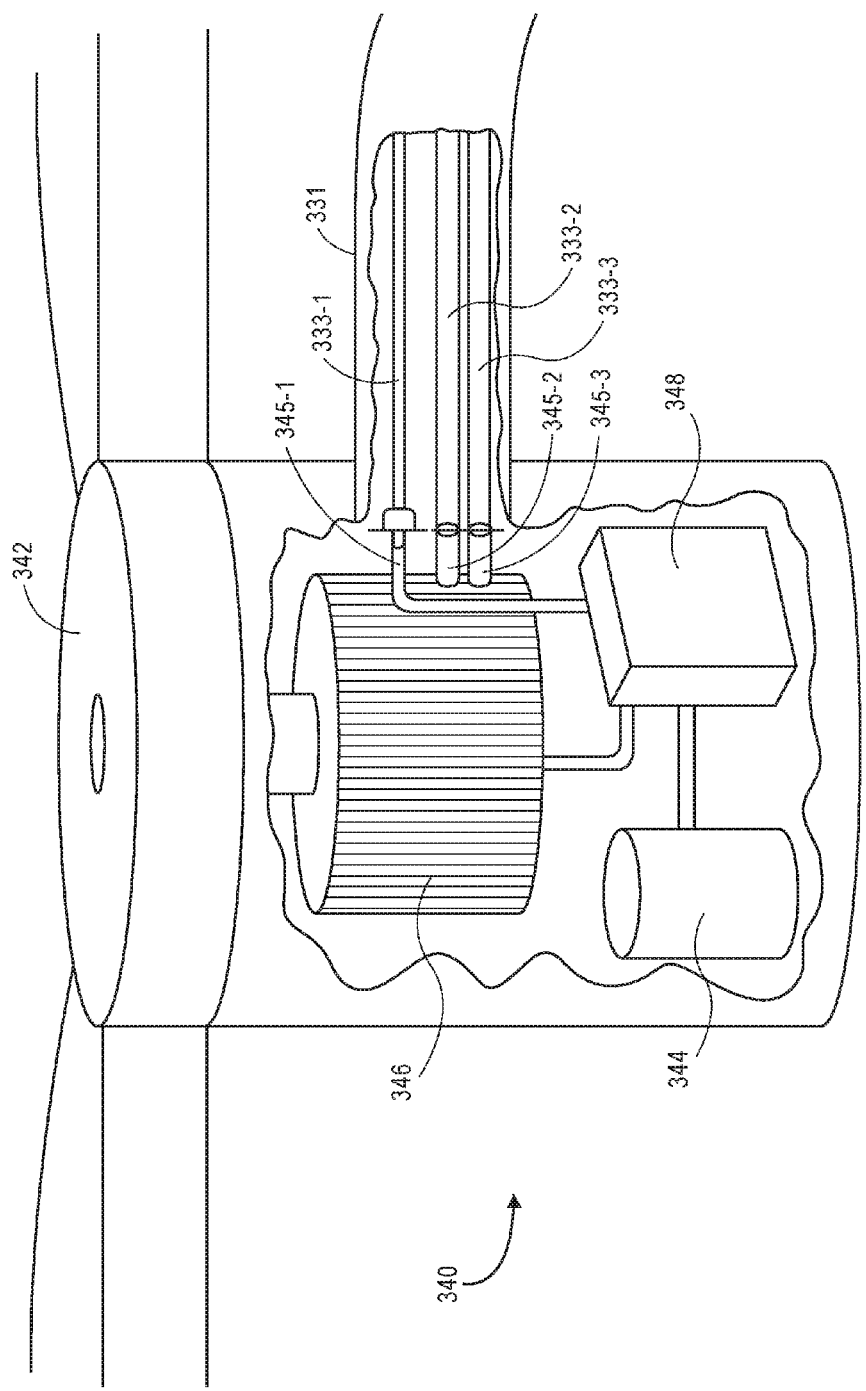
FIGS. 3A and 3B are views of aspects of propulsion modules in accordance with embodiments of the present disclosure.
Figure 3B:
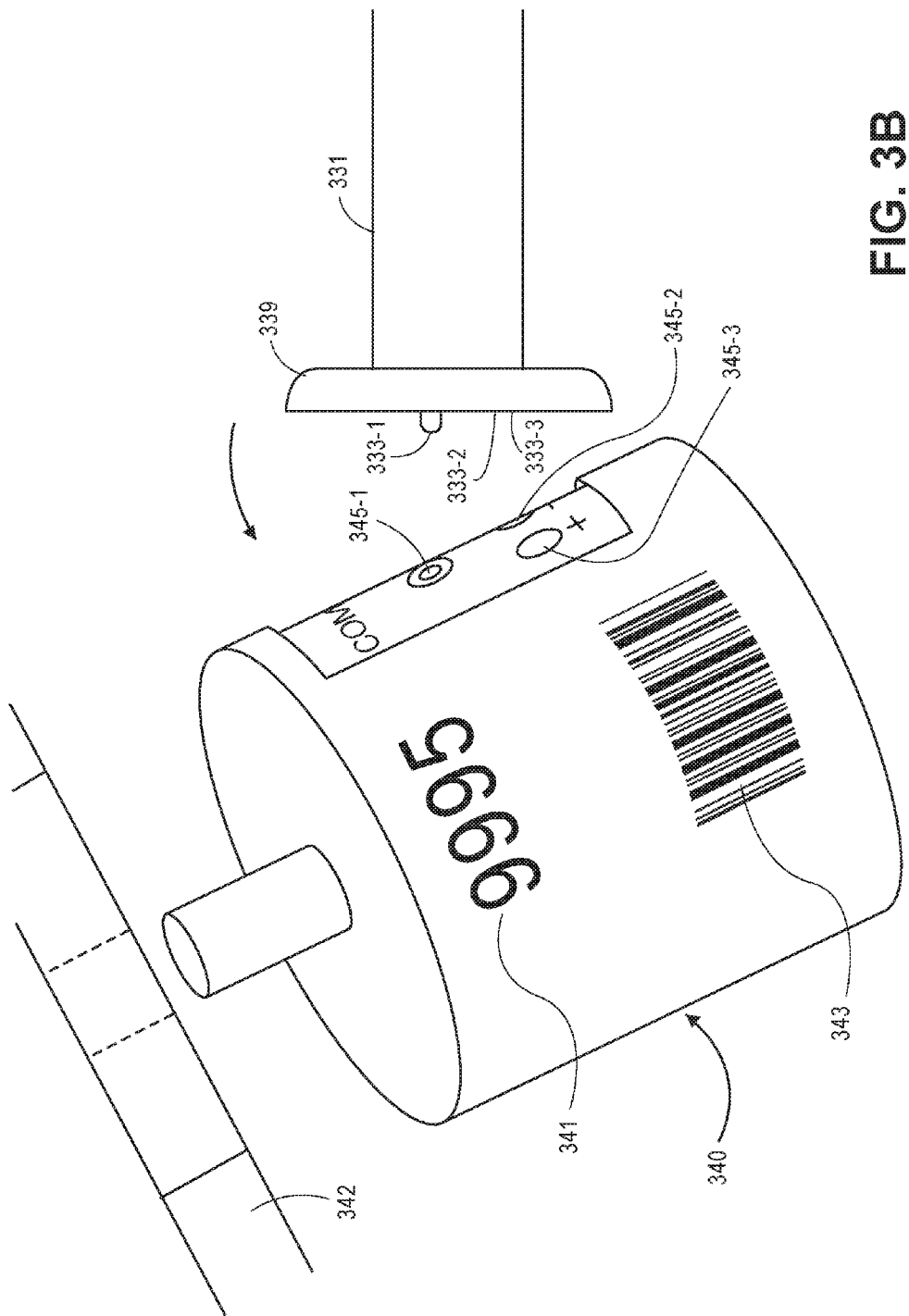

As is discussed above, the propulsion modules of the present disclosure may include motors, propellers, communication devices and controllers in a common unit, and may be quickly and effectively installed on an aerial vehicle, or removed from the aerial vehicle, as needed. Referring to FIGS. 3A and 3B, views of aspects of one propulsion module 340 in accordance with embodiments of the present disclosure are shown. Except where otherwise noted, reference numerals preceded by the number "3" shown in FIGS. 3A and 3B indicate components or features that are similar to components or features having reference numerals preceded by the number "2" shown in FIG. 2A or FIG. 2B, or by the number "1" shown in FIGS. 1A through 1G.

As is shown in FIGS. 3A and 3B, the module 340 is mounted to an arm 331 of an aerial vehicle (not shown). The module 340 includes a propeller 342, one or more sensors 344, a motor 346 and a controller 348. The sensors 344, the motor 346 and the controller 348 are shown as encased within a housing having an aerodynamic external shape for enhancing air flow around the module 340 and reducing friction while the aerial vehicle is moving in a direction having a horizontal component, which may be formed from any suitably durable material, e.g., carbon fiber, aluminum, titanium or a composite material, and includes an identifier 341 (e.g., one or more alphanumeric characters), a bar code 343, or any other markings or indicia relating to the module 340 or the aerial vehicle (not shown) to which the module 340 is mounted.

The propeller 342 is mounted to a shaft or mast of the motor 346 extending through the housing, e.g., from an interior cavity through to an exterior of the housing, with one or more bolted, quick-release or other connections. The motor 346 may be a DC brushless motor, or any other suitable type of motor. The sensors 344 may be any type of device for sensing operational characteristics of the aerial vehicle, or environmental conditions in which the aerial vehicle is located. The controller 348 may be any communications device for communicating with an operations system onboard the aerial vehicle, or with one or more external computer devices, e.g., by sending and/or receiving digital or analog data over a network.

The module 340 further includes a communications contact 345A for mating with a communications contact 333-1 within the arm 331 when the module 340 is mounted thereto, and power contacts 345-2, 345-3 for mating with power contacts 333-2, 333-3 within the arm 331. For example, the communications contacts 333-1, 345-1 or the power contacts 333-2, 333-3, 345-2, 345-3 may be formed from blocks, posts, crimps, plugs and sockets, blades, rings and spades, or any other form of electrical connector that be known to those of ordinary skill in the pertinent arts. One or more of the communications contacts 333-1, 345-1 may be male and another of such contacts may be female. Alternatively, the communications contacts 333-1, 345-1 may each comprise plate-like elements that couple when placed into contact with one another.

In some embodiments, the communications contacts 333-1, 345-1 may comprise electrical conductors, fiber optic cables, or any other elements for enabling communication between the controller 348 and one or more computer systems (e.g., the onboard operations system 230A of FIG. 2A) provided on the aerial vehicle to which the module 340 is mounted. For example, the communications contacts 333-1, 345-1 may be joined by any type or form of fiber optic coupling, e.g., a threaded coupling, a clip-based coupling, a snap-based coupling, a bayonet connector, that may be formed prior to installing the module 340 onto the arm 331, or in the process of installing the module 340 thereon.

Additionally, in some embodiments, those of ordinary skill in the pertinent arts will recognize that the controller 348 may communicate wirelessly with such computer systems (e.g., the onboard operations system 230B of FIG. 2B). Additionally, in some embodiments, the power contacts 333-2, 333-3, 345-2, 345-3 may include electrical conductors of sufficient capacity to provide power to the module 340 from one or more power sources onboard an aerial vehicle to which the module 340 is mounted. Alternatively, in some other embodiments, the motor 346 may be powered by non-electric fuels (e.g., gasoline), and the arm 331 may include components for making a fluid connection with a tank or other reservoir of such fuels provided on the aerial vehicle to which the module 340 is mounted.

The module 340 may be mounted to the arm 331 in any manner. As is shown in FIG. 3B, the module 340 may be detached from the arm 331 at a connection plate 339, e.g., on a distal end of the arm 331, in a manner that opens the connections between the communications contact 345-1 of the module 340 and the communications contact 333-1 of the arm 331, and the connection between the power contacts 345-2, 345-3 of the module 340 mating with power contacts 333-2, 333-3 within the arm 331. The module 340 may then be further evaluated by visual or manual inspection, or using one or more computer devices, e.g., to determine whether any maintenance on the module 340 or the respective components may be necessary.

Figure 4B:
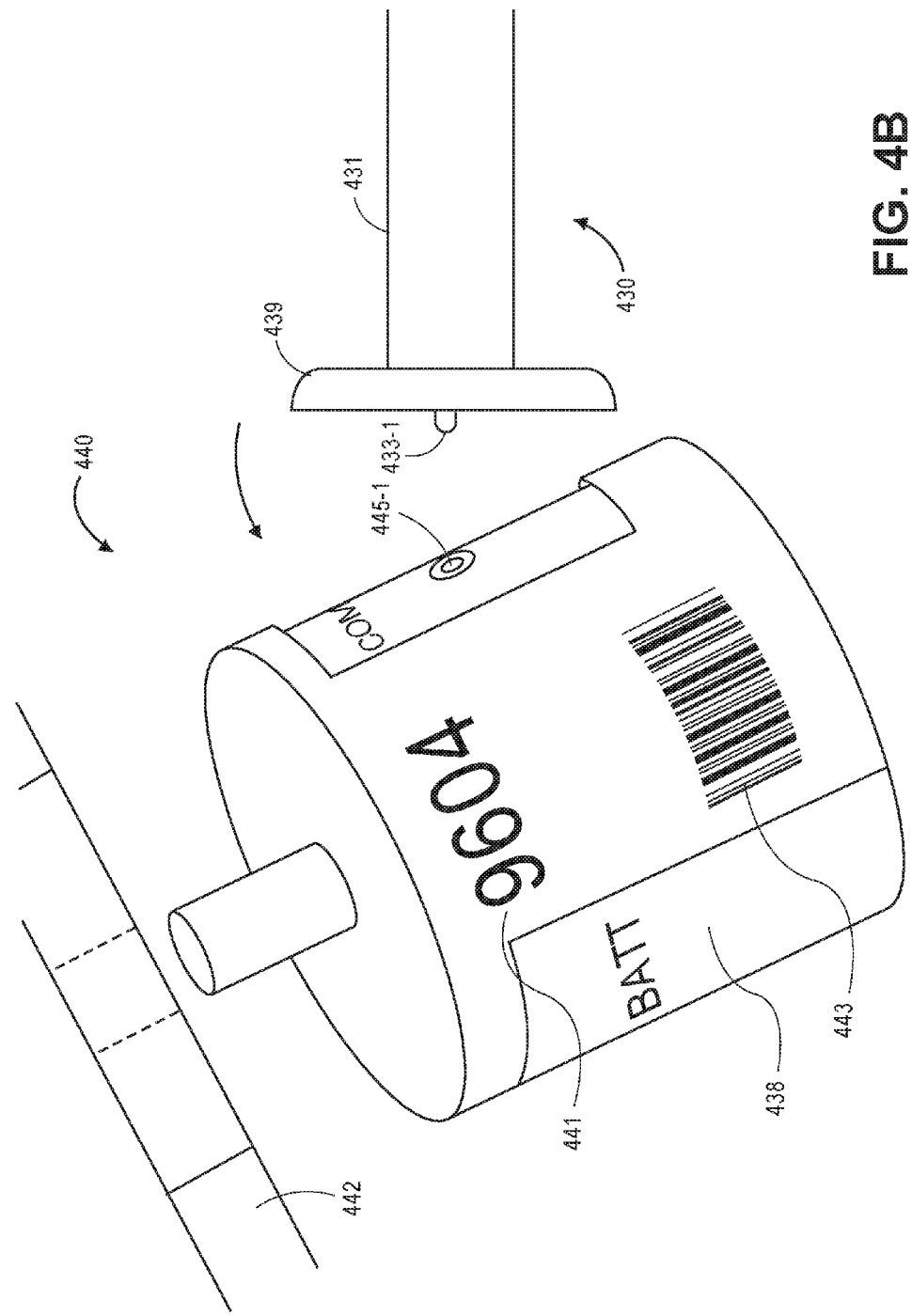

As is also discussed above, the propulsion modules may also include power sources for powering motors, sensors, transceivers or any other components provided therein. Incorporating power sources within such modules increases the autonomy of the modules and facilitates their installation or substitution onto one or more aerial vehicles while further reducing the weight of such vehicles, e.g., by reducing the lengths of electrical cabling required to deliver electrical power from a centralized power source to motors that may be disposed on arms or other extensions therefrom. Referring to FIGS. 4A, 4B and 4C, views of aspects of one propulsion module 440 in accordance with embodiments of the present disclosure are shown. Except where otherwise noted, reference numerals preceded by the number "4" shown in FIGS. 4A through 4C indicate components or features that are similar to components or features having reference numerals preceded by the number "3" shown in FIGS. 3A and 3B, by the number "2" shown in FIG. 2A or FIG. 2B, or by the number "1" shown in FIGS. 1A through 1G.

As is shown in FIGS. 4A through 4C, the module 440 is mounted to an arm 431 of an aerial vehicle (not shown) and includes a propeller 442, one or more sensors 444, a motor 446, a controller 448 and a battery or other power source 438. The sensors 444, the motor 446, the controller 448 and the battery 438 are encased within an interior cavity of a common housing, which may be formed from any suitably durable material. The propeller 442 may also be mounted to a shaft or mast of the motor 446 extending through the housing, e.g., with one or more bolted, quick-release or other connections.

The module 440 further includes a communications contact 445-1 for mating with a communications contact 433 within the arm 431 when the module 440 is mounted thereto. Unlike the module 340 of FIGS. 3A and 3B, however, the module 440 does not include any external power connections that extend through the housing, and instead includes power connections 445-2, 445-3, 445-4, 445-5 between the battery 438 and the motor 446. Accordingly, the weight of the aerial vehicle may be reduced considerably, without losing any functionality, by providing the battery 438 within the module 440 and without requiring any conductors.

Moreover, in some embodiments, the controller 448 may operate wirelessly, and neither the communications contact 445-1 of the module 440 nor the communications contact 433-1 of the arm 431 may be required. In such embodiments, the only junction between the module 440 and the arm 431 may be physical or structural means for joining the module 440 to an aerial vehicle.

As is shown in FIG. 4B, the module 440 may be detached from the arm 431 at a connection plate 439, thereby opening the contact between the communications contact 445-1 of the module 440 nor the communications contact 433-1 of the arm 431.

Additionally, the battery 438 or other components within the module 430 may be provided in one or more subsections of the module 430 (e.g. sub-modules) that may themselves be removed from the module 430, in order to perform inspections, maintenance or other operations on only such components, or to replace only such components when required. Referring to FIG. 4C, the battery 438 is shown as having been ejected from the module 440, thereby opening connections between the power contacts 445-2, 445-4 and the power contacts 445-3, 445-5. For example, where the module 440 is properly functioning in all respects, but merely requires a battery charge or replacement, the battery 438 may be ejected and a replacement battery (not shown) may be installed therein, and the aerial vehicle may be returned to service. Just as the use of detachable propulsion modules on an aerial vehicle facilitates the performance of maintenance, repairs or replacement on the aerial vehicle, providing one or more components of a module in detachable sub-modules further facilitates the performance of maintenance, repair or replacement on the module. For example, the battery 438 may be charged from an external source by forming connections with the power contacts 445-4, 445-5 and the external source, and a replacement battery may be installed in the module 440 and connected to the power contacts 445-2, 445-3.

Figure 5B:
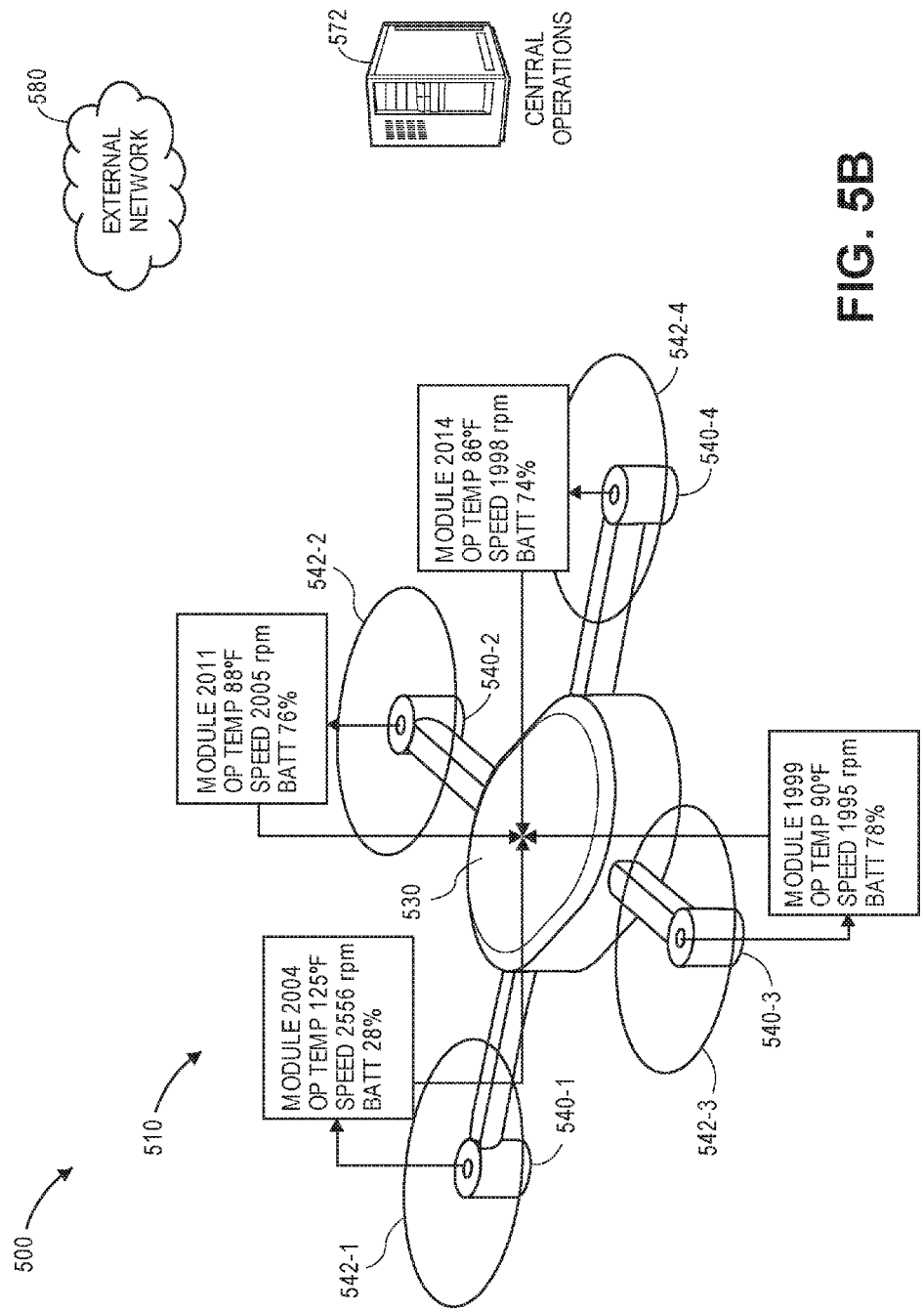
Figure 5C:
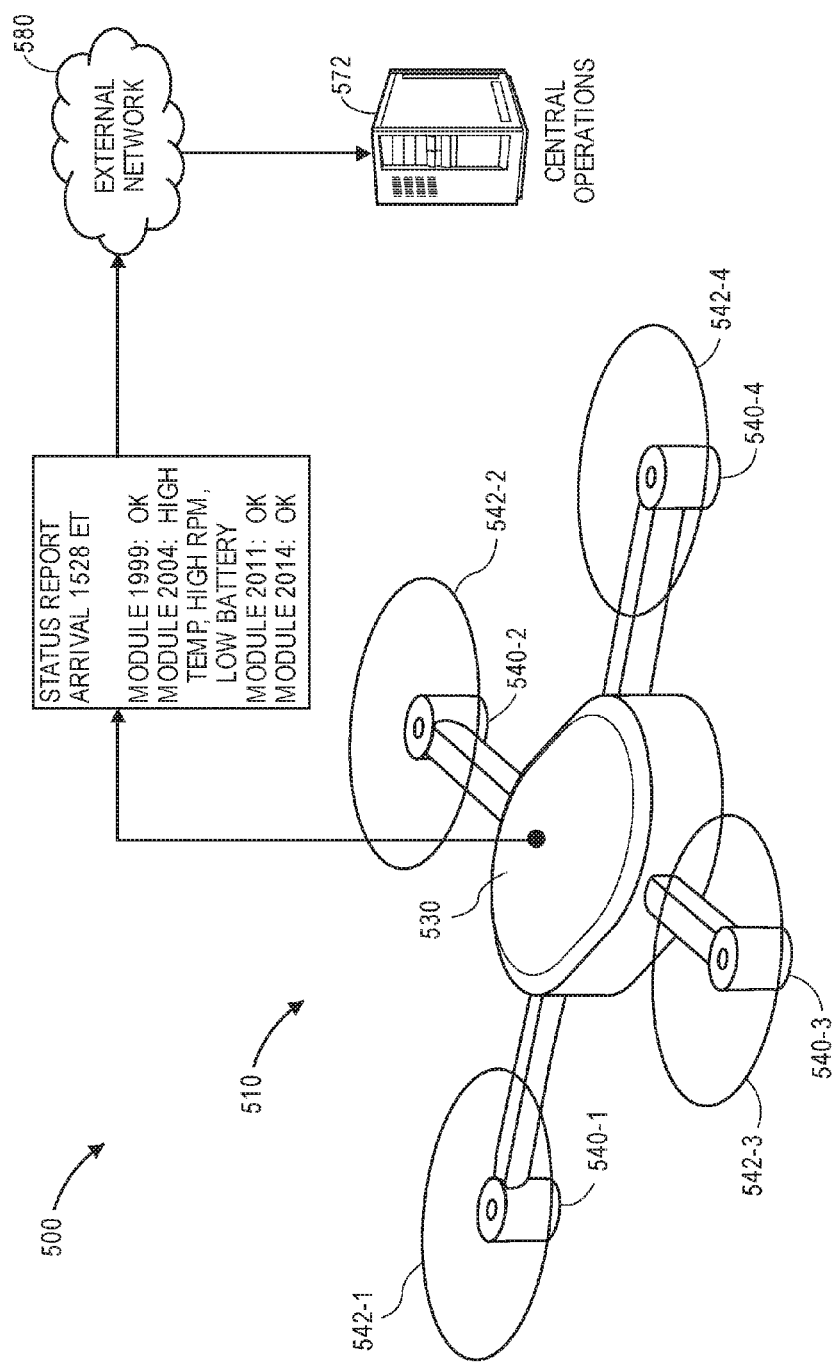

As is discussed above, the propulsion modules of the present disclosure may include transceivers or other transmitting or receiving equipment for communicating with an operations system provided onboard an aerial vehicle, or an operations system in one or more alternate or virtual locations, e.g., in a "cloud"-based environment. For example, an operations system operating onboard an aerial vehicle may transmit instructions to one or more propulsion modules, via wired or wireless means, and may receive information or data from such propulsion modules, e.g., information or data regarding the operation of the respective modules or the aerial vehicle in general (such as one or more status reports), information or data regarding an environment in which the aerial vehicle is operating. Referring to FIGS. 5A through 5C, views of aspects of one system 500 including an aerial vehicle having propulsion modules in accordance with embodiments of the present disclosure. Except where otherwise noted, reference numerals preceded by the number "5" shown in FIGS. 5A through 5C indicate components or features that are similar to components or features having reference numerals preceded by the number "4" shown in FIGS. 4A through 4C, by the number "3" shown in FIGS. 3A and 3B, by the number "2" shown in FIG. 2A or FIG. 2B, or by the number "1" shown in FIGS. 1A through 1G.

As is shown in FIG. 5A, the system 500 includes an operating aerial vehicle 510 in operation, a central operations server 572 and a network 580. The aerial vehicle 510 further includes an onboard operations system 530 and a plurality of propulsion modules 540-1, 540-2, 540-3, 540-4. The onboard operations system 530 may perform any functions, transmit any instructions, or receive any information or data regarding the operation of the aerial vehicle 510 or one or more of the modules 540-1, 540-2, 540-3, 540-4, including but not limited to one or more of the functions described above with regard to the propulsion modules 230A, 230B of FIGS. 2A and 2B. Each of the modules 540-1, 540-2, 540-3, 540-4 includes a propeller 542-1, 542-2, 542-3, 542-4, and may include one or more motors, sensors, transceivers and/or power sources or other components (not shown) for causing the propellers 542-1, 542-2, 542-3, 542-4 to rotate at selected speeds. For example, as is shown in FIG. 5A, the onboard operations system 530 transmits instructions to each of the modules 540-1, 540-2, 540-3, 540-4, e.g., via a wired or wireless network, directing each of the modules 540-1, 540-2, 540-3, 540-4 to operate in a specific mode (e.g., vertical) and to provide a status report to the onboard operations system 530.

As is shown in FIG. 5B, in response to the instructions provided by the onboard operations system 530, each of the modules 540-1, 540-2, 540-3, 540-4 may return information or data regarding their respective onboard operations. For example, as is shown in FIG. 5B, each of the modules 540-1, 540-2, 540-3, 540-4 returns an identifier, an operating temperature, an angular velocity and a battery level. As is further shown in FIG. 5B, the modules 540-2, 540-3, 540-4 each report similar operating temperatures ranging between eighty-six and ninety degrees Fahrenheit (86° F.-90° F.), similar angular velocities of approximately two thousand revolutions per minute (2000 rpm), and similar battery levels ranging from seventy-four to seventy-eight percent (74-78%). The module 540-1, however, reports a substantially higher operating temperature of one hundred twenty-five degrees Fahrenheit (125° F.), a substantially higher angular velocity of two thousand five hundred fifty-six revolutions per minute (2556 rpm) and a significantly lower battery level of twenty-eight percent (28%), suggesting that the module 540-1 is not operating properly, or is otherwise operating in a manner that causes the propeller 542-1 to rotate at high speeds, thereby generating higher operating temperatures and draining the battery level at a rate that greatly exceeds the rates of those of the other modules 540-2, 540-3, 540-4, and may require maintenance, repair or replacement.

As is shown in FIG. 5C, after receiving the status reports from each of the modules 540-1, 540-2, 540-3, 540-4, the aerial vehicle 510 may generate and transmit a summary report indicative of conditions of the respective modules 540-1, 540-2, 540-3, 540-4 to a central operations server 572, which may be provided in a physical location, or in one or more alternate or virtual locations, via the external network 580. For example, the central operations server 572 may be provided in a physical location having one or more facilities for conducting take-off or landing operations (e.g., pads, runways, hangars, or other facilities for receiving, maintaining, repairing or hosting aerial vehicles). Alternatively, the central operations server 572 may be housed in a virtual location, e.g., in the "cloud," but may be in communication with one or more physical locations having such facilities, and may transmit one or more instructions, information or data regarding the aerial vehicle 510 to such locations upon receiving the summary report from the aerial vehicle 510.

The summary report provided by the aerial vehicle 510 indicates an estimated time of arrival of the aerial vehicle 510 at a destination, and also reports both the satisfactory status of the modules 540-2, 540-3, 540-4, and the adverse operating conditions of the module 540-1 (e.g., the high temperatures, high angular velocities and the low battery level). Accordingly, the central operations server 572 may receive and evaluate the report to determine whether the aerial vehicle 510 should be diverted to an alternate destination for immediate repairs to the module 540-1, or to replace the module 540-1, or to ensure that a replacement propulsion module awaits the aerial vehicle 510 upon its arrival. By reporting their respective operating statuses to the onboard operations system 530, which is in communication with the central operations server 572, the modules 540-1, 540-2, 540-3, 540-4 may further shorten the time required to maintain the aerial vehicle 510 in an adequate operating condition. For example, in response to the summary report, the central operations server 572 may cause a replacement module to be provided at a destination for the aerial vehicle 510, or at an alternate destination (e.g., at an intervening waypoint between an origin and the destination), and the module 540-1 may be removed and replaced at the alternate destination. In some embodiments, the modules 540-1, 540-2, 540-3, 540-4 may bypass the onboard operations system 530 and communicate with the central operations system 572 directly or via the external network 580.

As is further discussed above, the propulsion modules of the present disclosure may be mounted to an aerial vehicle in any manner that securely binds the modules and their components to the aerial vehicle and establishes one or more power or communications connections, if necessary, with an onboard operations system provided on the aerial vehicle. Referring to FIGS. 6A through 6E, views of aspects of propulsion modules 640A, 640B, 640C, 640D, 640E in accordance with embodiments of the present disclosure are shown. Except where otherwise noted, reference numerals preceded by the number "6" shown in FIGS. 6A through 6E indicate components or features that are similar to components or features having reference numerals preceded by the number "5" shown in FIGS. 5A through 5C, by the number "4" shown in FIGS. 4A through 4C, by the number "3" shown in FIGS. 3A and 3B, by the number "2" shown in FIG. 2A or FIG. 2B, or by the number "1" shown in FIGS. 1A through 1G.

Each of the modules 640A, 640B, 640C, 640D, 640E may include one or more motors, sensors, transceivers or other communications equipment and/or power sources provided within a common housing. The modules 640A, 640B, 640C, 640D, 640E may be configured for mating with a propeller (not shown) via a shaft or mast extending through the housing, e.g., with one or more bolted, quick-release or other connections.

Figure 6A:
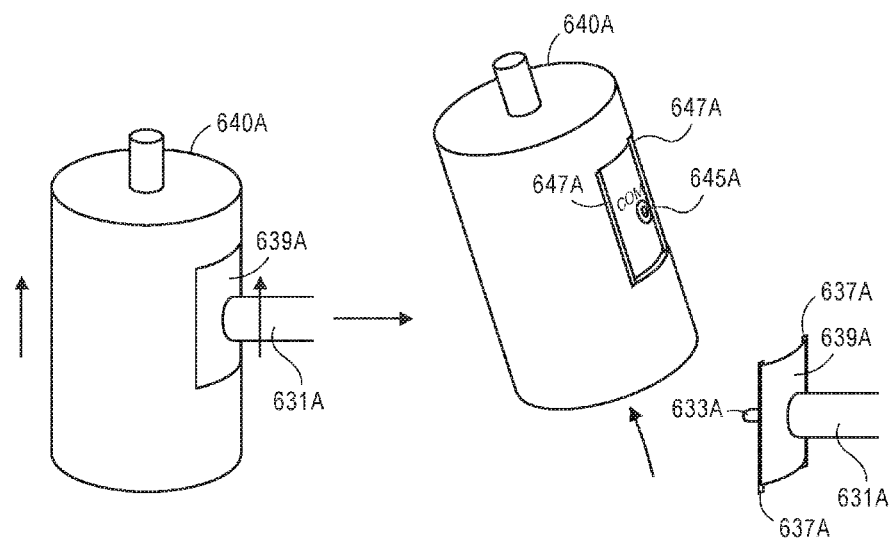
FIGS. 6A through 6E are views of aspects of propulsion modules in accordance with embodiments of the present disclosure.

In some embodiments, the modules of the present disclosure may be connected to an aerial vehicle via one or more sliding connections between corresponding elements provided on the modules 640A, 640B, 640C, 640D, 640E and the aerial vehicle. As is shown in FIG. 6A, the module 640A is mounted to an arm 631A of an aerial vehicle (not shown) at a connection plate 639A. As is further shown in FIG. 6A, in order to remove the module 640A from the connection plate 639A, the module 640A may be slid or guided along a set of tracks 637A provided along the connection plate 639A and a corresponding set of tracks 647A provided on an external surface of the module 640A. Removing the module 640A from the connection plate 639A may also cause a connection between a communications contact 633A provided on the connection plate 639A and a communication contact 645A provided on the module 640A to open. Alternatively, in some embodiments, as is discussed above, the connection plate 639A and the module 640A may further include one or more power contacts or other connections for transferring power from the aerial vehicle to the module 640A or vice versa. In still other embodiments, as is also discussed above, the connection plate 639A and the module 640A need not include any communications contacts, e.g., where the module 640A is configured to communicate wirelessly with one or more operations systems, such as an operations system provided onboard the aerial vehicle, or in one or more external locations.

Figure 6B:
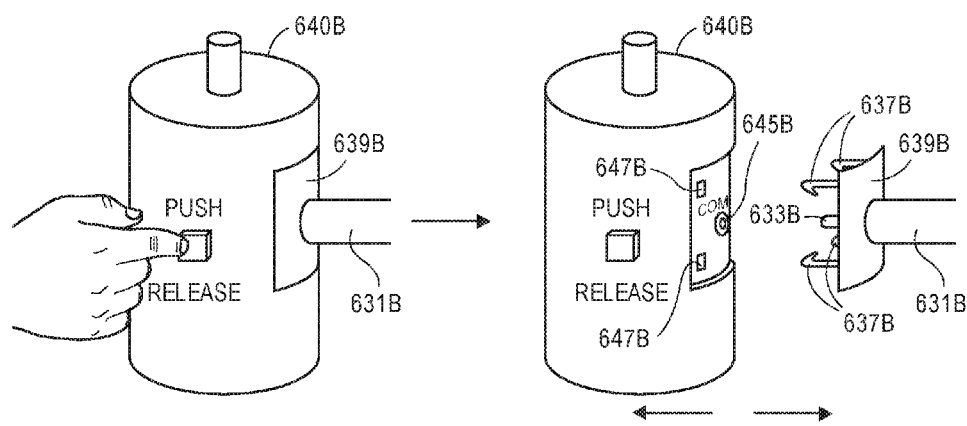

Additionally, in other embodiments, the modules of the present disclosure may be further connected to the aerial vehicle via one or more clip or cantilever hook connections, or other snap-fit joints. As is shown in FIG. 6B, the module 640B is mounted to an arm 631B of an aerial vehicle (no shown) at a connection plate 639B, e.g., by a plurality of hooks 637B provided on the connection plate 639B, which are inserted into corresponding slots or holes 647B provided on external surfaces of the module 640B. As is shown in FIG. 6B, the module 640B may thus be removed from the connection plate 639B by a manual force that overcomes the frictional forces provided by the hooks 637B within the slots 647B (e.g., where an angle defined by the hooks 637B is less than ninety degrees, or 90°) and/or by contacting a manual release provided on the module 640B to release the hooks 637B from the slots 647B (e.g., where the angle defined by the hooks 637B is equal to ninety degrees, or) 90°. As is discussed above with regard to the module 640A of FIG. 6A, removing the module 640B from the connection plate 639B of FIG. 6B may open any connections that may exist between the arm 631B and the module 640B, including but not limited to a connection between a communications contact 645B provided on the module 640B and a communications contact 633B provided on the connection plate 639B (or any other electrical connections between the 631B and the module 640B, which are not shown in FIG. 6B). Alternatively, such connections may be opened by any associated or independent action, e.g., by disconnecting leads associated with each of the module 640B and the arm 631B after the module 640B has been removed from the connection plate 639B, or in any other manner.

Figure 6C:
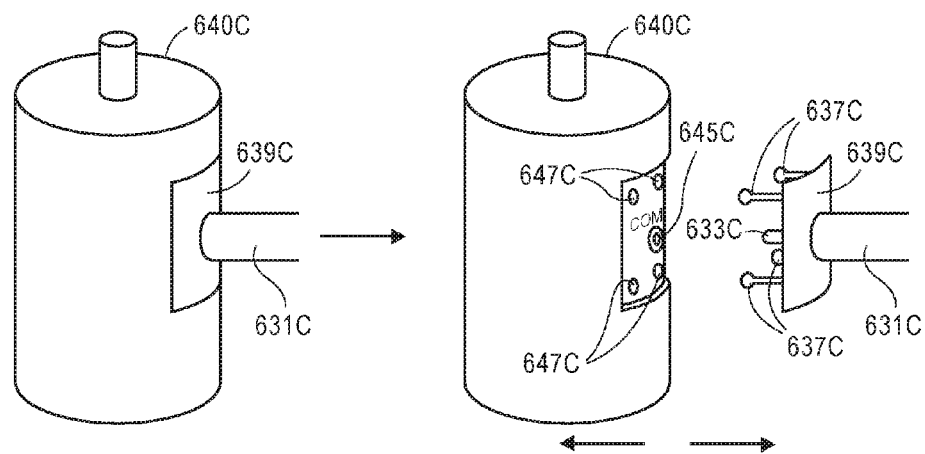

Similarly, in other embodiments, the modules of the present disclosure may be connected to the aerial vehicle by ball-and-socket connections. As is shown in FIG. 6C, the module 640C is mounted to an arm 631C of an aerial vehicle (not shown) at a connection plate 639C, e.g., by a plurality of balls 637C inserted into a plurality of sockets 647C provided on the module 640C. Alternatively, the module 640C or the connection plate 639C may further include one or more manual operators for releasing the balls 637C from the sockets 647C. Connections between the module 640C and the aerial vehicle, e.g., power or communications connections, including but not limited to a connection between a communications contact 633C provided on the connection plate 639C and a communications contact 645C provided on the module 645C may be opened when the module 640C is removed from the connection plate 639C, or by any associated or independent action.

Figure 6D:
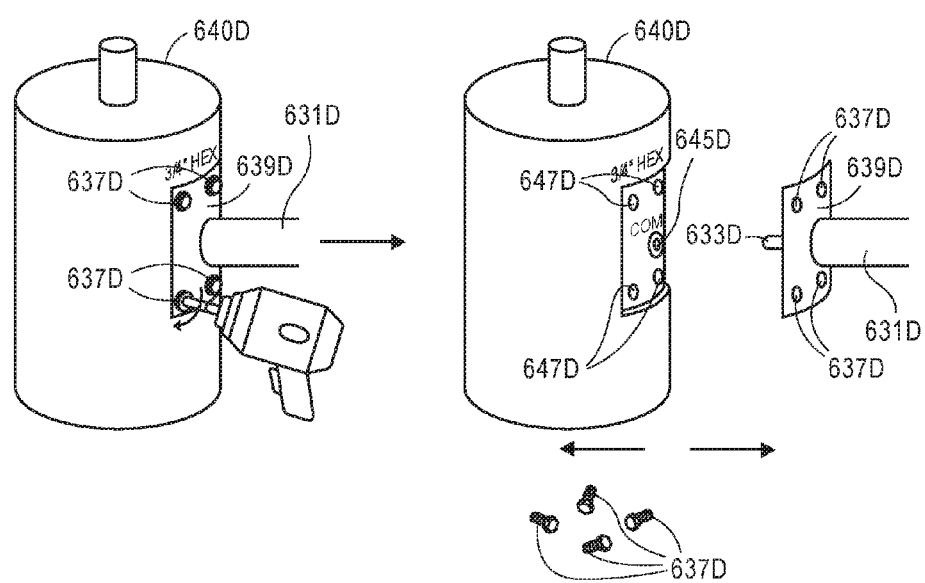

In other embodiments, the modules of the present disclosure may be connected to the aerial vehicle by threaded or bolted connections. As is shown in FIG. 6D, the module 640D is mounted to an arm 631D of an aerial vehicle (not shown) at a connection plate 639D, e.g., by a plurality of bolts 637D inserted through holes in the connection plate 639D, and tightened into corresponding openings 647D provided in the module 640D. The bolts 637D may be removed by manual or automatic means, e.g., by an electric wrench or other rotating implement having a socket corresponding to a shape of heads of the bolts 637D, or by one or more standard or ratcheting wrenches (not shown). Connections between the module 640D and the aerial vehicle, e.g., a connection between a communications contact 633D provided on the connection plate 639D and a communications contact 645D provided on the module 645D may be opened when the module 640D is removed from the connection plate 639D, or by any associated or independent action.

Figure 6E:
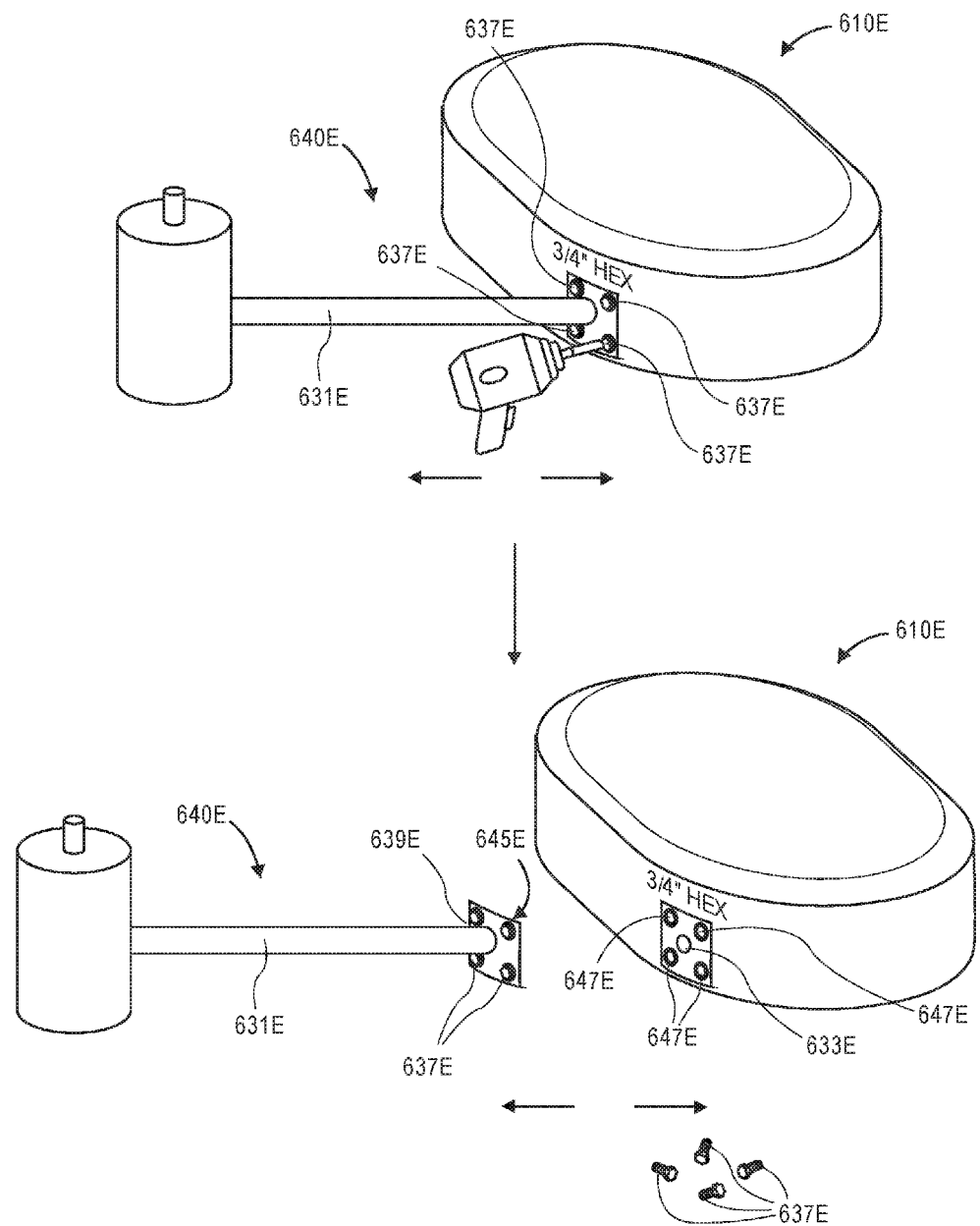

In other embodiments, the modules of the present disclosure may include additional features or elements for mounting the modules to an aerial vehicle. As is shown in FIG. 6E, the module 640E further comprises an arm 630E and a connection plate 639E that is mounted to an aerial vehicle 610E, e.g., by a plurality of bolts 637E inserted through holes in the connection plate 639E, and tightened into corresponding openings 647E provided in the aerial vehicle 610E. Like the bolts 637D of FIG. 6D, the bolts 637E may be removed by manual or automatic means, e.g., by an electric wrench or other rotating implement having a socket corresponding to a shape of heads of the bolts 637E, or by one or more standard or ratcheting wrenches (not shown). Connections between the module 640E and the aerial vehicle, e.g., a connection between a communications contact 645E provided on the connection plate 639E and a communications contact 633E provided on the aerial vehicle 610E may be opened when the module 640E is removed from the connection plate 639E, or by any associated or independent action.

Those of ordinary skill in the pertinent arts will recognize that modules may be joined to (or removed from) arms or other elements of aerial vehicles in any manner or fashion, or by any means, including one or more of the systems or methods described above with regard to FIGS. 6A through 6E. Those of ordinary skill in the pertinent arts will further recognize that two or more systems or methods may be utilized to join a module to an aerial vehicle, or remove the module therefrom, or that different modules may be joined to different portions of an aerial vehicle using different systems or methods. Moreover, those of ordinary skill in the pertinent arts will also recognize that the components described above as being provided on the modules 640A, 640B, 640C, 640D, 640E or the arms 631A, 631B, 631C, 631D, 631E may be juxtaposed with one another. For example, referring again to FIG. 6B, the module 640B may be configured with one or more hooks, and the arm 631B may include one or more slots or openings, as well as one or more manual operators, rather than the converse. Furthermore, whereas FIGS. 6A through 6D depict the removal of the modules 640A, 640B, 640C, 640D from the arms 631A, 631B, 631C, 631D, those of ordinary skill in the pertinent arts will recognize that the modules 640A, 640B, 640C, 640D may typically be mounted to the arms 631A, 631B, 631C, 631D in a reverse fashion, such as is shown in FIG. 6E, and in any manner or fashion, or by any means.

Additionally, the propulsion modules of the present disclosure may be mounted to or removed from an aerial vehicle by humans, such as is shown in FIGS. 1A through 1G, or in an entirely automatic fashion, e.g., using one or more robots. For example, when it is determined that an aerial vehicle requires maintenance or repairs to one or more propulsion modules provided thereon, or that one of such modules requires replacement, the aerial vehicle may travel to a location having maintenance facilities and/or replacement modules, if the aerial vehicle is capable of doing so. The aerial vehicle and one or more of the modules may be further serviced or evaluated by one or more machines, e.g., robots. Referring to FIGS. 7A through 7D, views of aspects of one system 700 including an aerial vehicle having propulsion modules in accordance with embodiments of the present disclosure. Except where otherwise noted, reference numerals preceded by the number "7" shown in FIGS. 7A through 7D indicate components or features that are similar to components or features having reference numerals preceded by the number "6" shown in FIGS. 6A through 6E, by the number "5" shown in FIGS. 5A through 5C, by the number "4" shown in FIGS. 4A through 4C, by the number "3" shown in FIGS. 3A and 3B, by the number "2" shown in FIG. 2A or FIG. 2B, or by the number "1" shown in FIGS. 1A through 1G.

Figure 7A:
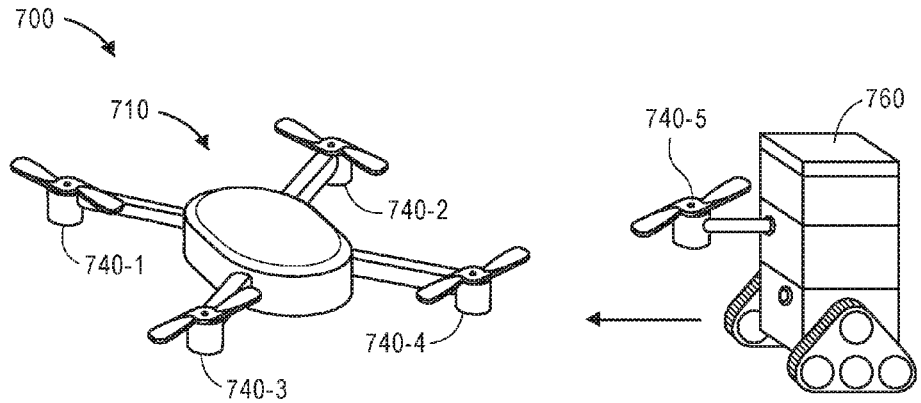
FIGS. 7A through 7D are views of aspects of one system including an aerial vehicle having propulsion modules in accordance with embodiments of the present disclosure.

As is shown in FIG. 7A, an aerial vehicle 710 includes a plurality of propulsion modules 740-1, 740-2, 740-3, 740-4 of the present disclosure mounted thereto. As is discussed above, the modules 740-1, 740-2, 740-3, 740-4 may include motors, propellers, sensors, transceivers, power sources or any components that may be required or desired in order to generate lift and/or thrust for the aerial vehicle 710. As is shown in FIGS. 7A and 7B, when one of the modules 740-4 is not operating properly, an autonomous mobile robot 760 having a replacement propulsion module 740-5 may approach the aerial vehicle 710 to conduct one or more analyses, diagnostic operations, or other inspections or evaluations.

Figure 7B:
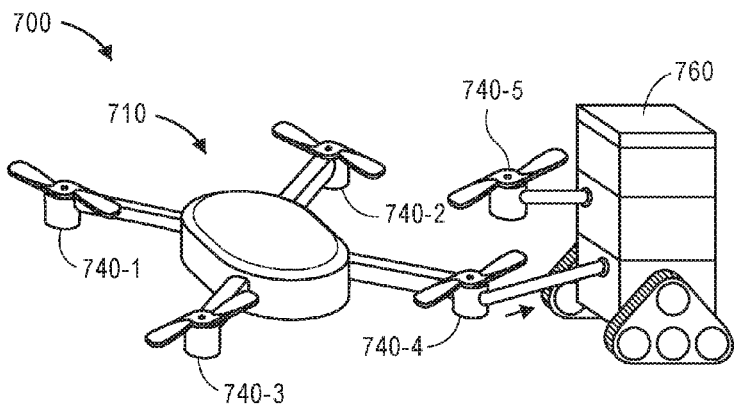
Figure 7C:
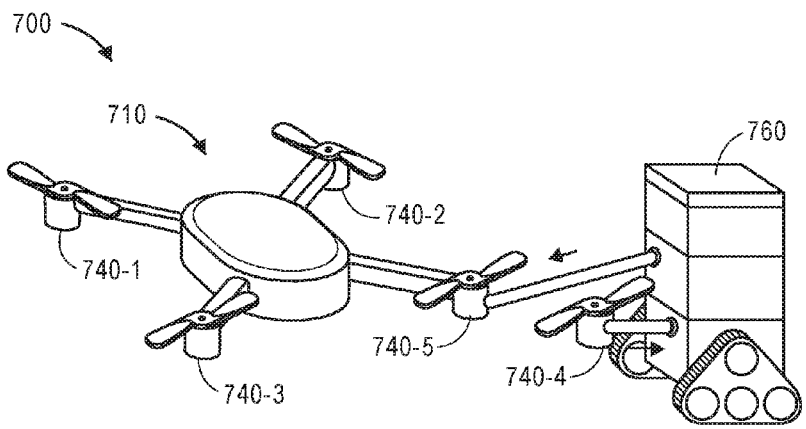
Figure 7D:
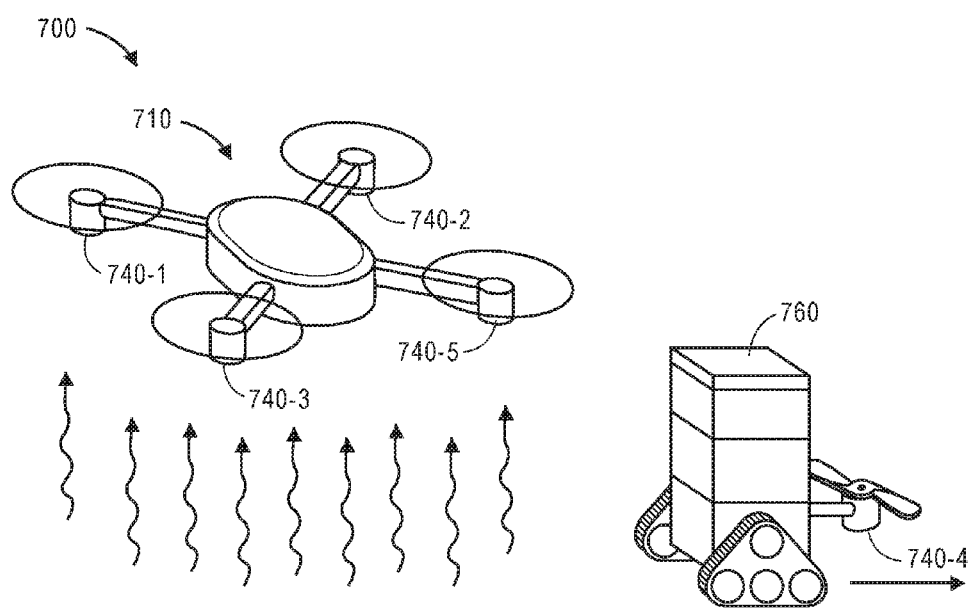

As is further shown in FIGS. 7B and 7C, the autonomous mobile robot 760 may, for example, identify and evaluate the aerial vehicle 710 and/or the module 740-4, and remove the module 740-4 therefrom, if necessary. Likewise, the autonomous mobile robot 760 may install the module 740-5 on the aerial vehicle 710, e.g., on an arm or mounting plate to which the module 740-4 had been mounted, in accordance with a reciprocal or corresponding process. Once the autonomous mobile robot 760 has installed the module 740-5 on the aerial vehicle 710, one or more diagnostic operations or evaluations may confirm whether the aerial vehicle 710 is capable of flight and, as is shown in FIG. 7D, the aerial vehicle 710 may depart with the modules 740-1, 740-2, 740-3, 740-5 operating under power after the autonomous mobile robot 760 has cleared a predetermined range or traveled a predefined distance from the aerial vehicle 710.

The autonomous mobile robot 760 may include one or more devices, sensors, extensions, appurtenances or motorized components for performing any of the operations described herein, e.g., for transporting the replacement module 740-5 to the aerial vehicle 710, for removing the module 740-4 from the aerial vehicle 710, for installing the replacement module 740-5 on the aerial vehicle 710, or for departing from the aerial vehicle 710 with the module 740-4, and such components need not be described in greater detail herein.

Those of ordinary skill in the pertinent arts will recognize that the modules of the present disclosure, including but not limited to one or more of the modules 740-1, 740-2, 740-3, 740-4 provided on the aerial vehicle 710 of FIGS. 7A through 7D, may be automatically installed on or removed from aerial vehicles by any suitable machine in accordance with the present disclosure, and are not limited to robots that are either autonomous or mobile. For example, in one embodiment, an aerial vehicle may be configured to automatically land or be manually deposited on a conveyor belt passing within a range of one or more machines (e.g., robots) that are configured to identify and assess one or more propulsion modules provided thereon, and to perform maintenance or repairs on such modules, or replace one or more of such modules, as needed. The installation of modules onto aerial vehicles, and the removal of modules from aerial vehicles, are not limited to any of the embodiments (e.g., manual or automatic) described herein.

The propulsion modules of the present disclosure are truly modular in nature. For example, in some embodiments, the same module may be installed on two or more different aerial vehicles, even if such aerial vehicles are of different sizes, classes or operating capacities, or are dedicated to performing different functions, so long as the two or more aerial vehicles include identical or corresponding connections for mating with the module. For example, where one aerial vehicle has a propulsion module that requires replacement in order to conduct a mission having a high level of priority, and another aerial vehicle having one or more of such modules is not currently operating and/or is not scheduled for operations in the near future, or is scheduled to perform a mission having a low level of priority, the latter aerial vehicle may be cannibalized, e.g., one of the modules provided thereon and removed therefrom, and a replacement module from the second aerial vehicle may be installed on the former aerial vehicle.

Figure 8:
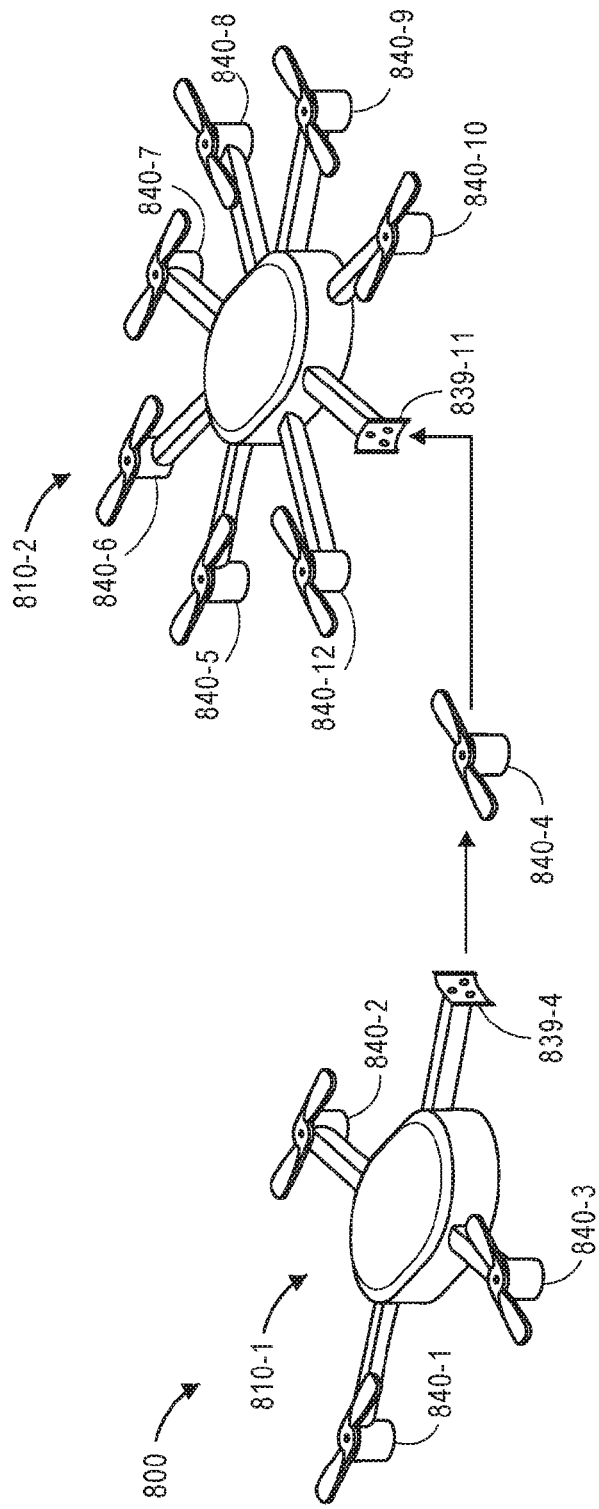
FIG. 8 is a view of aspects of one system including aerial vehicles having propulsion modules in accordance with embodiments of the present disclosure.

Referring to FIG. 8, a view of aspects of one system 800 including aerial vehicles having propulsion modules in accordance with embodiments of the present disclosure is shown. Except where otherwise noted, reference numerals preceded by the number "8" shown in FIG. 8 indicate components or features that are similar to components or features having reference numerals preceded by the number "7" shown in FIGS. 7A through 7D, by the number "6" shown in FIGS. 6A through 6E, by the number "5" shown in FIGS. 5A through 5C, by the number "4" shown in FIGS. 4A through 4C, by the number "3" shown in FIGS. 3A and 3B, by the number "2" shown in FIG. 2A or FIG. 2B, or by the number "1" shown in FIGS. 1A through 1G.

The system 800 includes a pair of aerial vehicles 810-1, 810-2. The first aerial vehicle 810-1 is configured to operate with four propulsion modules 840-1, 840-2, 840-3, 840-4 (e.g., the first aerial vehicle 810-1 may be a quad-copter). The second aerial vehicle 810-2 is configured to operate with eight propulsion modules (e.g., the second aerial vehicle 810-2 may be an octo-copter), but only includes seven propulsion modules 840-5, 840-6, 840-7, 840-8, 840-9, 840-10, 840-12, and a free connection plate 839-11 for mounting an eighth propulsion module. As is discussed above, each of the propulsion modules 840-1, 840-2, 840-3, 840-4, 840-5, 840-6, 840-7, 840-8, 840-9, 840-10, 840-12 shown in FIG. 8 may include a motor, a propeller, one or more sensors, controllers and/or power sources provided on or in association with a common housing. Moreover, each of the propulsion modules 840-1, 840-2, 840-3, 840-4, 840-5, 840-6, 840-7, 840-8, 840-9, 840-10, 840-12 shown in FIG. 8 is fungible, e.g., the modules 840-1, 840-2, 840-3, 840-4, 840-5, 840-6, 840-7, 840-8, 840-9, 840-10, 840-12 may be exchanged for one another, or operated interchangeably on the aerial vehicles 810-1, 810-2, or on one or more other aerial vehicles (not shown) have arms or other extensions or elements that are configured to receive such modules 840-1, 840-2, 840-3, 840-4, 840-5, 840-6, 840-7, 840-8, 840-9, 840-10, 840-12 thereon.

For example, as is shown in FIG. 8, the module 840-4 that is mounted to a connection plate 839-4 provided on the first aerial vehicle 810-1 may be removed therefrom and installed on a connection plate 839-11 provided on the second aerial vehicle 810-2. Where the connection plates 839-4, 839-11 include commonly located power or communications contacts provided thereon and connection devices, the removal of the module 840-4 from the connection plate 839-4 and the installation of the module 840-4 onto the connection plate 839-11 may be performed in a reciprocal fashion, simply and effectively, thereby enabling the second aerial vehicle 810-2 to perform any missions with a full complement of modules 840-5, 840-6, 840-7, 840-8, 840-9, 840-10, 840-4, 840-12 thereon. Another replacement module (not shown) may then be installed on the connection plate 839-4, as necessary, to enable the first aerial vehicle 810-1 to return to service at a later time.

In accordance with the present disclosure, the propulsion modules that may be releasably installed on an aerial vehicle may have common ratings or capacities (e.g., power, thrust or lift), such that a replacement of a module results in no net change in the operational capabilities of the aerial vehicle. Alternatively, the modules may have different ratings or capacities (e.g., power, thrust or lift), and replacing one module with another module may result in a net change to the operational capabilities of the aerial vehicle. For example, where an aerial vehicle is scheduled to conduct a long-range mission, the aerial vehicle may be equipped with high-capacity propulsion modules having substantially larger propellers or batteries, or more powerful motors. Where the same aerial vehicle is scheduled to conduct a short-range mission, the high-capacity propulsion modules may be removed from the aerial vehicle, and replaced with low-capacity propulsion modules (e.g., modules having smaller propellers or batteries, or less powerful motors), and the high-capacity propulsion modules may be installed on aerial vehicles that are scheduled to perform other long-range missions.

Additionally, in accordance with the present disclosure, an aerial vehicle may be operated with fewer than a full complement of propulsion modules thereon when performing missions for which maximum levels of lift, thrust, range or speed are not required. When maximum lift, thrust, range or speed are desired, however, the aerial vehicle may be equipped with additional propulsion modules accordingly. The number of propulsion modules mounted to an aerial vehicle may be selected on any operational basis in accordance with the present disclosure.

Figure 9A:
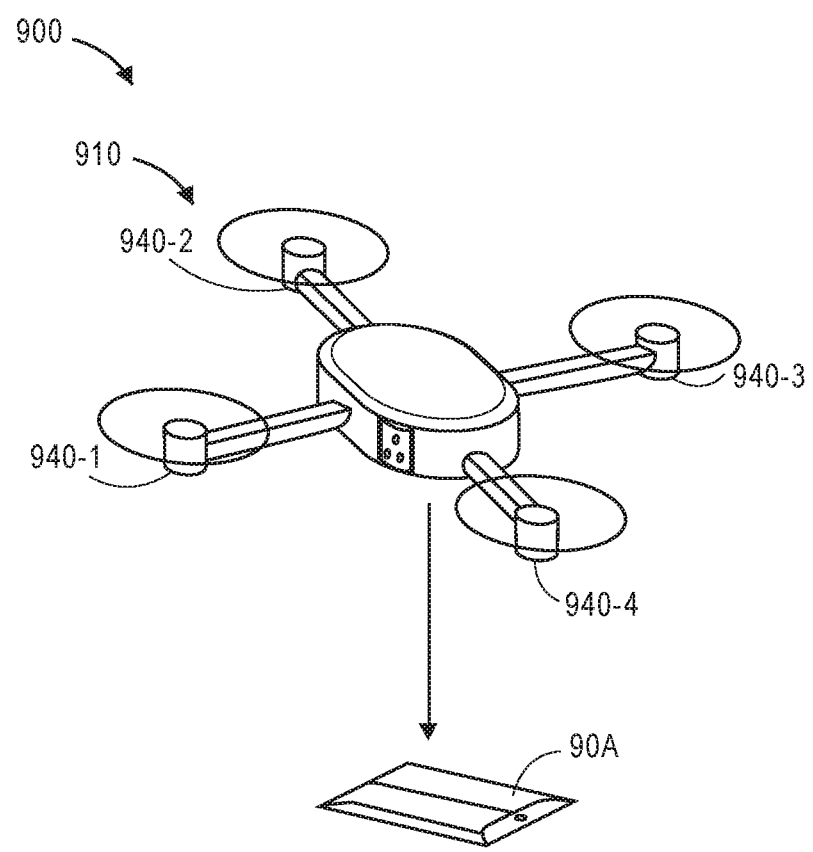
FIGS. 9A through 9C are views of aspects of one system including aerial vehicles having propulsion modules in accordance with embodiments of the present disclosure.
Figure 9B:
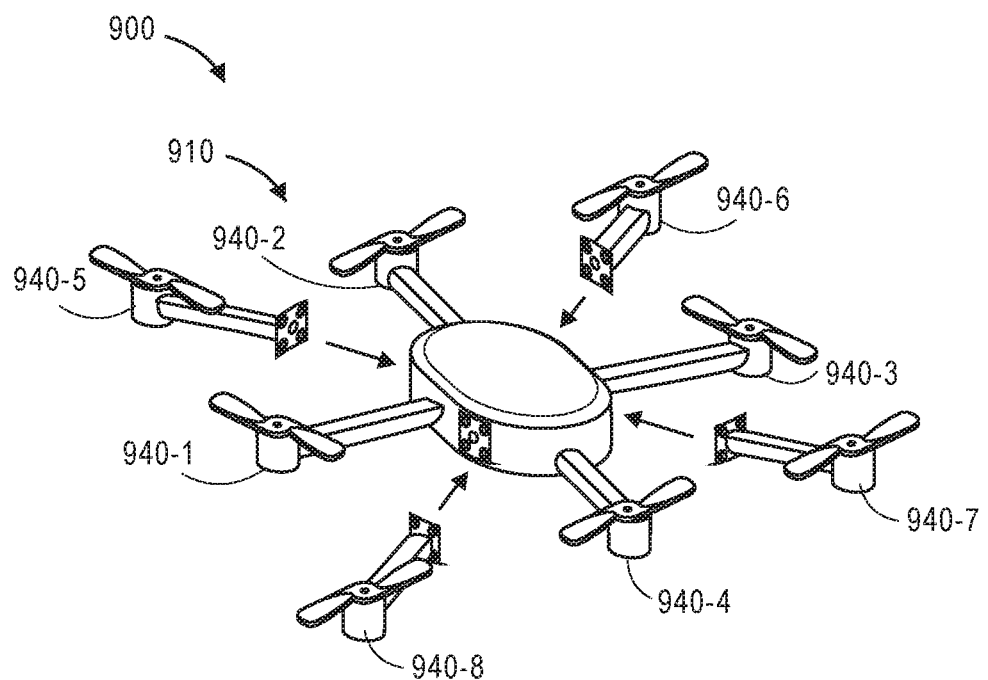
Figure 9C:
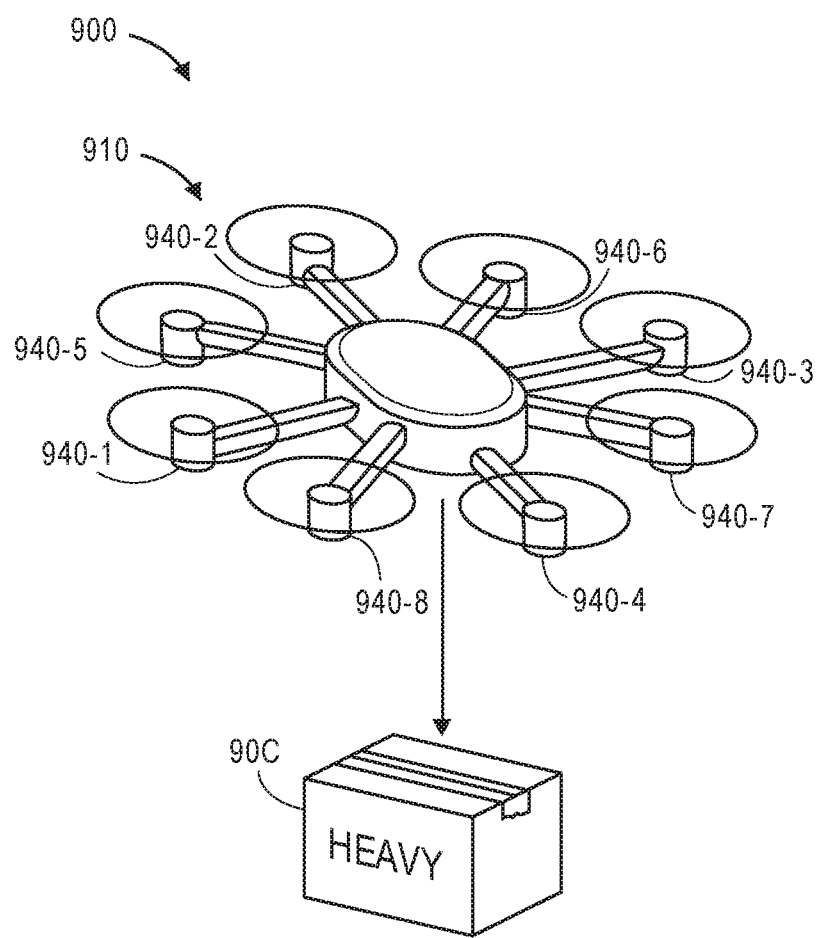

Referring to FIGS. 9A through 9C, views of aspects of systems 900A, 900B including aerial vehicles having propulsion modules in accordance with embodiments of the present disclosure are shown. Except where otherwise noted, reference numerals preceded by the number "9" shown in FIGS. 9A through 9C indicate components or features that are similar to components or features having reference numerals preceded by the number "8" shown in FIG. 8, by the number "7" shown in FIGS. 7A through 7D, by the number "6" shown in FIGS. 6A through 6E, by the number "5" shown in FIGS. 5A through 5C, by the number "4" shown in FIGS. 4A through 4C, by the number "3" shown in FIGS. 3A and 3B, by the number "2" shown in FIG. 2A or FIG. 2B, or by the number "1" shown in FIGS. 1A through 1G.

As is shown in FIG. 9A, the system 900 includes an aerial vehicle 910 performing a mission involving a retrieval of a comparatively small payload 90A (e.g., an envelope or small package) for which excessive lift is not necessarily required. The aerial vehicle 910 is configured to operate with up to eight propulsion modules mounted thereto. However, as is shown in FIG. 9A, the aerial vehicle 910 includes just four propulsion modules 940-1, 940-2, 940-3, 940-4 and four connection plates that do not have any propulsion modules mounted thereto. Accordingly, because the retrieval of the payload 90A does not require a maximum amount of lift, the aerial vehicle 910 may operate with fewer than a maximum number of propulsion modules therewith. Those of ordinary skill in the pertinent arts will recognize that electrical or power connections provided on connection plates may be covered with a releasable seal or protective layer, e.g., plastic, rubber or metal, that may mate with the connection plates in a manner that mimics one or more of the modules 940-1, 940-2, 940-3, 940-4 when the connection plates do not have any modules 940-1, 940-2, 940-3, 940-4 mounted thereto.

Where the aerial vehicle 910 performs missions for which greater lift capacities are required, however, the aerial vehicle 910 may be equipped with additional modules 940-5, 940-6, 940-7, 940-8, which may be mounted the aerial vehicle 910, as needed, such as is shown in FIG. 9B. The additional modules 940-5, 940-6, 940-7, 940-8 may be mounted to the aerial vehicle 910 in any suitable manner that securely binds the modules and their components to the aerial vehicle and establishes one or more power or communications connections, if necessary, with an onboard operations system provided on the aerial vehicle, e.g., such as is shown in FIGS. 6A through 6E. Referring to FIG. 9C, after the additional modules 940-5, 940-6, 940-7, 940-8 have been installed, the aerial vehicle 910 includes a full complement of modules 940-1, 940-5, 940-2, 940-6, 940-3, 940-7, 940-4, 940-8, e.g., eight modules, when performing a mission involving a retrieval of a comparatively large payload 90C (e.g., a box including one or more heavy items). After the mission is completed, the aerial vehicle 910 may perform another mission that requires enhanced lift capacities with the full complement or, alternatively, one or more of the propulsion modules 940-1, 940-5, 940-2, 940-6, 940-3, 940-7, 940-4, 940-8 may be removed from the aerial vehicle 910 and mounted to another aerial vehicle (not shown), in order to enhance the lift capacities of that other aerial vehicle, or for any other purpose.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, the propulsion modules disclosed herein are not limited for use in quad-copters or octo-copters, or in unmanned aerial vehicles. Rather, the propulsion modules of the present disclosure may be utilized in connection with any type of aerial vehicle that is equipped to operate any number of motors or propellers for generating lift or thrust. Moreover, the shapes or sizes of the propulsion modules of the present disclosure are also not limited. Rather, the propulsion modules of the present disclosure may take any shape or size, and may be preferably installed on an aerial vehicle in a manner that results in a smooth and continuous surface and limited resistance to air flow, and in an aerodynamically consistent manner. The manner in which the propulsion modules disclosed herein may be installed on a frame or other component of an aerial vehicle, or removed therefrom, is not limited by any of the references to specific embodiments herein.

Furthermore, although some of the embodiments disclosed herein reference the use of unmanned aerial vehicles to deliver payloads from warehouses or other like facilities to customers, those of ordinary skill in the pertinent arts will recognize that the systems and methods disclosed herein are not so limited, and may be utilized in connection with any type or form of aerial vehicle (e.g., manned or unmanned) having fixed or rotating wings for any intended industrial, commercial, recreational or other use.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An unmanned aerial vehicle (UAV) comprising:
   a frame having a plurality of mounting extensions, wherein each of the plurality of mounting extensions has a proximal end and a distal end, wherein each of the proximal ends of the mounting extensions is fixedly joined to the frame, and wherein each of the distal ends of the mounting extensions comprises a connection plate;
   a control system provided in association with the frame, wherein the control system comprises at least one computer processor and at least one data store; and
   a plurality of propulsion modules, wherein each of the propulsion modules further comprises:
      a housing, wherein an external surface of the housing forms a releasable connection with the connection plate at the distal end of one of the plurality of mounting extensions, wherein each of the releasable connections is aerodynamically consistent between the external surfaces of the housings and the connection plates;
      a direct current (DC) brushless motor disposed within the housing, wherein the DC brushless motor comprises a shaft extending through the housing to an exterior of the housing;
      a propeller rotatably mounted to a distal end of the shaft; and
      a motor controller disposed within the housing, wherein the motor controller is in communication with the control system.

2. The UAV of claim 1, wherein each of the propulsion modules further comprises a releasable DC power source releasably disposed within the housing, and
   wherein each of the releasable DC power sources is coupled to at least one of the DC brushless motor or the motor controller within the corresponding housing.

3. The UAV of claim 1, wherein each of the motor controllers is in communication with the control system according to a wireless communications protocol.

4. The UAV of claim 1, wherein each of the propulsion modules comprises at least one sensor,
   wherein the control system is further configured to at least:
      transmit an instruction to operate each of the motors at a first rotational speed to each of the motor controllers;
      transmit a request for information regarding an operating status of each of the propulsion modules to each of the motor controllers;
      receive, in response to the request, first information regarding the operating status of each of the propulsion modules from each of the motor controllers, wherein at least some of the first information is determined using the at least one sensor of at least one of the propulsion modules;
      determine, based at least in part on the at least some of the first information, that the at least one of the propulsion modules is to be replaced with a replacement module; and
      transmit second information regarding the operating status of the at least one of the propulsion modules to at least one computer server over a network,
      wherein the second information comprises the at least some of the first information.

5. An aerial vehicle comprising:
   a frame having at least a first mounting extension, wherein a proximal end of the first mounting extension is rigidly joined to the frame, and wherein a distal end of the first mounting extension comprises a first mating interface; and a first propulsion module joined to the first mounting extension by a releasable physical connection, wherein the first propulsion module further comprises:
a housing having an external surface and an internal cavity, wherein at least a portion of the external surface is a second mating interface releasably coupled to the first mating interface to form the releasable physical connection;
a motor disposed within the internal cavity, wherein the motor comprises a shaft extending through an opening in the housing and having a distal end exterior to the housing;
a propeller rotatably mounted to the distal end of the shaft exterior to the housing; and
a controller disposed within the internal cavity.

6. The aerial vehicle of claim 5, further comprising an operational control system having at least one computer processor,
wherein the controller is in communication with the operational control system.

7. The aerial vehicle of claim 6, wherein the first mating interface comprises a first communication contact and the second mating interface comprises a second communications contact,
wherein the first communications contact and the second communications contact are coupled at the releasable physical connection to form a releasable communications connection, and
wherein the controller is in communication with the operational control system via the releasable communications connection.

8. The aerial vehicle of claim 7, wherein the releasable communications connection comprises at least one of an optical fiber cable or an Ethernet cable.

9. The aerial vehicle of claim 6, wherein the controller is in communication with the operational control system according to one or more wireless communication protocols.

10. The aerial vehicle of claim 5, further comprising an electrical power source mounted in association with the frame,
wherein at least one of the motor or the controller is configured to receive electrical power via the releasable physical connection from the electrical power source.

11. The aerial vehicle of claim 10, wherein the first mating interface comprises at least a first power contact and the second mating interface comprises at least a second power contact,
wherein the first power contact and the second power contact are coupled at the releasable physical connection to form a releasable power connection, and
wherein the at least one of the motor, the controller or the transceiver is configured to receive electrical power from the electrical power source via the releasable power connection.

12. The aerial vehicle of claim 5, wherein the first propulsion module further comprises an electrical power source disposed within the internal cavity,
wherein at least one of the motor, the controller or the transceiver is configured to receive electrical power from the electrical power source.

13. The aerial vehicle of claim 5, wherein the first mounting extension comprises a mounting plate formed from at least one of carbon fiber, aluminum, titanium or a composite material, and
wherein the mounting plate is releasably joined to the external surface of the housing at a flat, rounded, tapered, beveled or faceted junction.

14. The aerial vehicle of claim 5,
wherein the aerial vehicle is one of a class of aerial vehicles, and
wherein the first mating interface of the first mounting extension is common to the class of aerial vehicles.

15. The aerial vehicle of claim 5,
wherein the first propulsion module is one of a class of propulsion modules, and
wherein the second mating interface is common to the class of propulsion modules.

16. A method for operating an aerial vehicle comprising a frame, a mounting extension having a proximal end fixedly joined to the frame, and an onboard control system disposed within the frame,
wherein the method comprises:
releasably installing a first propulsion module on a distal end of the mounting extension of the aerial vehicle, wherein the first propulsion module comprises:
a first housing;
a first motor disposed within the first housing, wherein the first motor comprises a first shaft extending through an opening in the first housing;
a first propeller rotatably mounted to a distal end of the shaft external to the first housing;
a first motor controller disposed within the first housing, wherein the first motor controller is configured to control an operation of the first motor;
a first transceiver disposed within the first housing, wherein the first transceiver is in communication with the onboard control system and at least one of the first motor controller or the first motor; and
at least one first sensor;
transmitting, by the onboard control system, a first instruction to the first transceiver, wherein the first instruction instructs the first motor controller to initiate the operation of the first motor at a first power level;
transmitting, by the onboard control system, a second instruction to the first transceiver, wherein the second instruction instructs the first motor controller to terminate the operation of the first motor;
determining that the operation of the first motor is terminated;
in response to determining that the operation of the first motor is terminated,
removing the first propulsion module from the distal end of the mounting extension of the aerial vehicle; and
releasably installing a second propulsion module on the distal end of the mounting extension of the aerial vehicle, wherein the second propulsion module comprises:
a second housing;
a second motor disposed within the second housing, wherein the second motor comprises a second shaft extending through an opening in the second housing;
a second propeller rotatably mounted to a distal end of the shaft external to the second housing;
a second motor controller disposed within the second housing, wherein the second motor controller is configured to control an operation of the second motor;
a second transceiver disposed within the second housing, wherein the second transceiver is in communication with the onboard control system and at least one of the second motor controller or the second motor; and at least one second sensor;

determining that the second propulsion module is releasably installed on the distal end of the mounting extension;

in response to determining that the second propulsion module is releasably installed on the distal end of the mounting extension, transmitting, by the onboard control system, a second instruction to the second transceiver, wherein the second instruction instructs the second motor controller to initiate the operation of the second motor at a second power level.

17. The method of claim 16, further comprising:

during the operation of the first propulsion module, receiving, by the control system from the first transceiver, first information regarding at least one of an operating characteristic of the first propulsion module or an environmental condition of the aerial vehicle, wherein at least some of the first information is obtained by the at least one first sensor; and determining, based at least in part on the first information, that the first propulsion module requires replacement, wherein the second instruction is transmitted by the onboard control system to the first transceiver in response to determining that the first propulsion module requires replacement.

18. The method of claim 16, wherein releasably installing the first propulsion module on the mounting extension of the aerial vehicle further comprises:

establishing a first connection between a first communications contact coupled to the first motor controller and a second communications contact coupled to the onboard control system, and wherein removing the first propulsion module from the mounting extension of the aerial vehicle further comprises:

opening the first connection between the first communications contact and the second communications contact; and wherein releasably installing the second propulsion module on the mounting extension of the aerial vehicle further comprises:

establishing a second connection between a third communications contact coupled to the second motor controller and the second communications contact.

19. The method of claim 16, wherein the aerial vehicle further comprises an onboard power source, wherein releasably installing the first propulsion module on the mounting extension of the aerial vehicle further comprises:

establishing a first connection between a first power contact coupled to the first motor and a second power contact coupled to the onboard power source, wherein removing the first propulsion module from the mounting extension of the aerial vehicle further comprises:

opening the first connection between the first power contact and the second power contact; and wherein releasably installing the second propulsion module on the mounting extension of the aerial vehicle further comprises:

establishing a second connection between a third power contact coupled to the second motor and the second power contact.

20. The method of claim 16, wherein the first propulsion module further comprises a first power source disposed within the first housing, wherein the first power source is electrically coupled to the first motor, wherein the second propulsion module comprises a second power source disposed within the second housing, and wherein the second power source is electrically coupled to the second motor.

* * * * *